United States Patent
Korenshtein

(10) Patent No.: US 6,922,813 B1
(45) Date of Patent: Jul. 26, 2005

(54) PAGE PREREQUISITE CONTROL MECHANISM

(75) Inventor: Roni Korenshtein, Tel Aviv (IL)

(73) Assignee: E*Trade, Menlo Park, CA (US)

( * ) Notice: Subject to any disclaimer, the term of this patent is extended or adjusted under 35 U.S.C. 154(b) by 520 days.

(21) Appl. No.: 09/826,219

(22) Filed: Apr. 4, 2001

Related U.S. Application Data

(60) Provisional application No. 60/198,717, filed on Apr. 20, 2000, and provisional application No. 60/205,813, filed on May 19, 2000.

(51) Int. Cl.[7] ................................................ G09G 5/00
(52) U.S. Cl. ........................ 715/762; 715/764; 715/733; 707/1
(58) Field of Search ................................ 345/738, 741, 345/742, 730, 733, 760, 776, 708; 707/1–10; 705/35, 41, 42; 715/762, 764, 733

(56) References Cited

U.S. PATENT DOCUMENTS

| | | | | |
|---|---|---|---|---|
| 5,550,968 A | * | 8/1996 | Miller et al. ................. | 345/741 |
| 5,696,898 A | * | 12/1997 | Baker et al. ................. | 713/201 |
| 5,768,578 A | * | 6/1998 | Kirk et al. ................... | 707/100 |
| 5,784,058 A | * | 7/1998 | LaStrange et al. .......... | 345/738 |
| 5,826,267 A | * | 10/1998 | McMillan ...................... | 707/9 |
| 5,903,881 A | * | 5/1999 | Schrader et al. ............ | 705/42 |
| 5,920,848 A | * | 7/1999 | Schutzer et al. ............. | 705/42 |
| 5,983,245 A | * | 11/1999 | Newman et al. ............ | 715/513 |
| 5,991,882 A | * | 11/1999 | O'Connell .................... | 713/201 |
| 6,073,119 A | * | 6/2000 | Bornemisza-Wahr et al. | 705/42 |
| 6,078,907 A | * | 6/2000 | Lamm .......................... | 705/40 |
| 6,098,053 A | * | 8/2000 | Slater ........................... | 705/44 |
| 6,154,741 A | * | 11/2000 | Feldman ........................ | 707/9 |
| 6,175,877 B1 | * | 1/2001 | Zerber .......................... | 719/310 |
| 6,385,652 B1 | * | 5/2002 | Brown et al. ................ | 709/227 |

* cited by examiner

Primary Examiner—Raymond J. Bayerl
Assistant Examiner—Ting Zhou
(74) Attorney, Agent, or Firm—Blakely, Sokoloff, Taylor & Zafman LLP

(57) ABSTRACT

Apparatus and methods are provided for managing, tracking and controlling page prerequisites in a graphical user interface (GUI). According to one embodiment, in response to a request to display a destination page of the GUI and with reference to prerequisite information, one or more prerequisite pages associated with the destination page are identified. Then, a determination is made whether the requirements of an identified prerequisite page have been satisfied by invoking a method of an instance of a decider sub-component that causes stored information regarding the state of the identified prerequisite page to be retrieved from a current environment/context. Finally, the destination page is displayed if all the requirements of the one or more identified prerequisite pages have been satisfied, otherwise a prerequisite page having one or more requirements that remain unsatisfied is displayed.

26 Claims, 20 Drawing Sheets

<Attribute> = <Value>    810 promtp1 = please enter your name    820

Figure 8 (Prior Art)

<Object>.<Attribute> = <Value>    910

Obj1.attr1 = val11    920
Obj1.attr2 = val12    930
Obj2.attr1 = val21    940
Obj2.attr3 = val23    950

Trading prompt1 = please enter your name    960

Figure 9

<Object>.extends = <anotherObject> —1010

Obj1.attr1 = val11 —1020
Obj1.attr2 = val12 —1030

Obj2.extends=Obj1 —1040
Obj2.attr2 = val22 —1050
Obj2.attr3 = val23 —1060

Figure 10

<Context>.<Object>.<Attribute> = <Value> —1110

Obj1.attr1 = val11 —1120
Obj1.attr2 = val12 —1130
Page1.Obj1.attr2 = val112 —1140

Figure 11

<Context>.extends = <anotherContext> —1210

Obj1.attr1 = val11 —1220
Obj1.attr2 = val12 —1230
Page1.Obj1.attr2 = val112 —1240

Page2.extends = Page1 —1250
Page2.Obj1.attr2 = val212 —1260

Figure 12

Page2.extends=Page1
Page3.extends=Page2

Obj2.extends=Obj1
Obj3.extends=Obj2

```
1.      String getValue( String attrib ) {
2.
3.          // get the container name of this object
4.          String context = getContextName();
5.
6.          // get the name of the class of this executing object
7.          String object = getClass().getName();
8.
9.          // check to see if within this context a value is defined for the
10.         // specified attribute for objects of the currently executing object's
11.         // type, or for any of its parent objects
12.
13.         String result = getWithContextInheritance( context, object, attrib );
14.
15.         if (result == null) { // if it's null it didn't find it.
16.
17.         // now try to find the value of the attribute of the object
18.         // by ignoring the context
19.
20.         // this will look for the attribute in all objects that are extended by
21.         // the current object
22.
23.              result = getWithInheritance( object, attrib );
24.
25.         } // end if
26.
27.         return result;
28.
29.     } // end getValue
```

Figure 18

```
1.    String getWithContextInheritance(
2.        String context, String object, String attrib) {
3.
4.        // check if the attrib is found in the current context by climbing up
5.        // the object hierarchy if necessary
6.        String result = getWithObjInheritance( context, object, attrib );
7.
8.        if (result == null) { //didn't find it in the current context
9.            // check if this context extends another context
10.           context = resourceBundle.getString( context + ".extends" );
11.
12.           //context now contains the name of the parent context, if any
13.           if (context != null) // found a parent context
14.               // this is a recursive call that looks for the attribute
15.               // and climbs up the context hierarchy
16.               result = getWithContextInheritance( context, object, attrib );
17
18.       } //end if
19.
20.       return result;
21.
22.   } // end getWithContextInheritance
```

Figure 19

```
1.    String getWithObjInheritance( String context, String object, String attrib ) {
2.        // concatenate context, ".", the object, ".", and the attrib
3.        String lookFor = context + "." + object + "." + attrib;
4.
5.        // check if the combined attribute is found in the resource bundle
6.        String result = resourceBundle.getString( lookFor );
7.
8.        if (result == null) { // didn't find it in the current object
9.            // check if object extends another object, meaning
10.           // it has a parent.
11.           object = resourceBundle.getString( object + ".extends" );
12.
13.           //object now contains the name of the parent, if any
14.           if (object != null) // found a parent object
15.               // this is a recursive call that climbs up the
16.               // object's hierarchy while keeping the context unchanged.
17.               result = getWithObjInheritance( context, object, attrib );
18.
19.       } // end if
20.
21.       return result;
22.
23.   } // end getWithObjInheritance
```

Figure 20

```
1.      String getWithInheritance( String object, String attrib ) {
2.          // concatenate the object, ".", and the attrib
3.          String lookFor = object + "." + attrib;
4.
5.          // check if the combined attribute is found in the resource bundle
6.          String result = resourceBundle.getString( lookFor );
7.          if (result == null) { //didn't find it in the current object
8.              // check if object extends another object, meaning
9.              // it has a parent.
10.             object = resourceBundle.getString( object + ".extends" );
11.
12.             // object now contains the name of the parent, if any
13.             if (object != null) // found a parent object
14.                 // this is a recursive call. Look for the attribute
15.                 // in the parent or its parents
16.                 result = getWithInheritance( object, attrib );
17.
18.         } // end if
19.
20.         return result;
21.
22.     } // end getWithInheritance
```

Figure 21

PAGE PREREQUISITE CONTROL MECHANISM

This application claims the benefit of U.S. Provisional Application Nos. 60/198,717 and 60/205,813, filed Apr. 20, 2000 and May 19, 2000, respectively, both of which are incorporated herein by reference.

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

BACKGROUND OF THE INVENTION

1. Field of the Invention

The invention relates generally to graphical user interfaces (GUIs). More particularly, the invention relates to a mechanism for enforcing prerequisites in the context of GUI navigation.

2. Description of the Related Art

In the context of web page navigation, there may be various requirements that must be met before a particular page or content is accessible by a user. For example, a website may require that the user read and accept some disclosure, fill out a registration questionnaire, or login before certain content, such as real-time stock quotes, or pages, such as a securities trading page, or an account overview page, are made available to the user. Once all the requirements are met, e.g., the disclosure has been presented and acknowledged by the user, the protected content or pages, e.g., the securities trading page, may be displayed any time it is requested by the user. In this example, the displaying of the disclosure page thus becomes a "prerequisite" to displaying the securities trading page.

Of course, there might be a series of prerequisite pages that must be shown to the user; and some may require data entry by the user before their requirements are met. For example, login pages typically require both a user ID and a password to be entered. After the user is authenticated, a required disclosure page may be displayed to the user before the desired destination page is presented. The disclosure page may have an "I ACCEPT" button, which when selected, takes the user to the desired destination page. Prerequisite tracking is a simple issue when there is a one-to-one relationship between disclosure pages and the desired destination pages. However, it should be apparent that the complexity of prerequisite tracking increases rapidly as the number of destination pages requiring a particular disclosure page increases and as the number of inter-page dependencies to be enforced increases.

One potential solution to this prerequisite tracking problem is to have logic associated with the destination page, e.g., the securities trading page, perform the check whether the appropriate disclosure page has been displayed or not and if not to execute the appropriate code to cause its display. After the appropriate disclosure page has been displayed, subsequent requests for the securities trading page will not cause the disclosure page to be shown to the user since it has already been displayed. However, there are many disadvantages of this solution. First, every destination page becomes tightly coupled to its disclosure page(s). Second, changing the prerequisites or adding new prerequisites requires coding changes. Third, the reusability of pages is adversely affected since the destination page cannot be used in other contexts. Finally, if other pages require the same prerequisites, the same code needs to be copied to all such page objects. While the examples above have focused on pages as a whole, similar difficulties relating to prerequisite tracking exist in the context of web page sub-component interdependencies.

Thus, what is needed is a mechanism by which a web publisher may specify components and/or sub-components that are prerequisites to other components and/or sub-components. Also needed is framework for implementing a methodology by which prerequisite components and sub-components may ensure that their requirements have been met before they are displayed.

BRIEF SUMMARY OF THE INVENTION

Apparatus and methods are described for managing, tracking and controlling page prerequisites in a graphical user interface (GUI). According to one embodiment, prerequisite information regarding pages that are prerequisites to other pages is provided. In response to a request to display a destination page and with reference to the prerequisite information, one or more prerequisite pages associated with the destination page are identified. A "decider" sub-component of an identified prerequisite page is identified that is capable of confirming whether or not requirements of the identified prerequisite page have been satisfied. Then, an instance of the decider sub-component is created and a determination is made whether the requirements of the identified prerequisite All page have been satisfied by invoking a method of the decider sub-component instance that retrieves stored information regarding the state of the identified prerequisite page from a current environment/context. Finally, the destination page is displayed if all the requirements of the one or more identified prerequisite pages have been satisfied, otherwise a prerequisite page having one or more requirements that remain unsatisfied is displayed.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 8 illustrates prior art properties file syntax.

FIG. 9 illustrates an improved properties file syntax that enables definition and access of properties on an object-by-object basis according to one embodiment of the present invention.

FIG. 10 illustrates an improved properties file syntax that enables inheritance of properties according to one embodiment of the present invention.

FIG. 11 illustrates an improved properties file syntax that enables the specification and/or overriding of object properties as they are used in different contexts according to one embodiment of the present invention.

FIG. 12 illustrates an improved properties file syntax that enables inheritance of contexts according to one embodiment of the present invention.

FIG. 18 illustrates exemplary code for the getValue method of FIG. 17 according to one embodiment of the present invention.

FIG. 19 illustrates exemplary code for the getWithContextInheritance method of FIG. 17 according to one embodiment of the present invention.

FIG. 20 illustrates exemplary code for the getWithObjInheritance method of FIG. 17 according to one embodiment of the present invention.

FIG. 21 illustrates exemplary code for the getwithInheritance method of FIG. 17 according to one embodiment of the present invention.

DETAILED DESCRIPTION OF THE INVENTION

Figure 1:
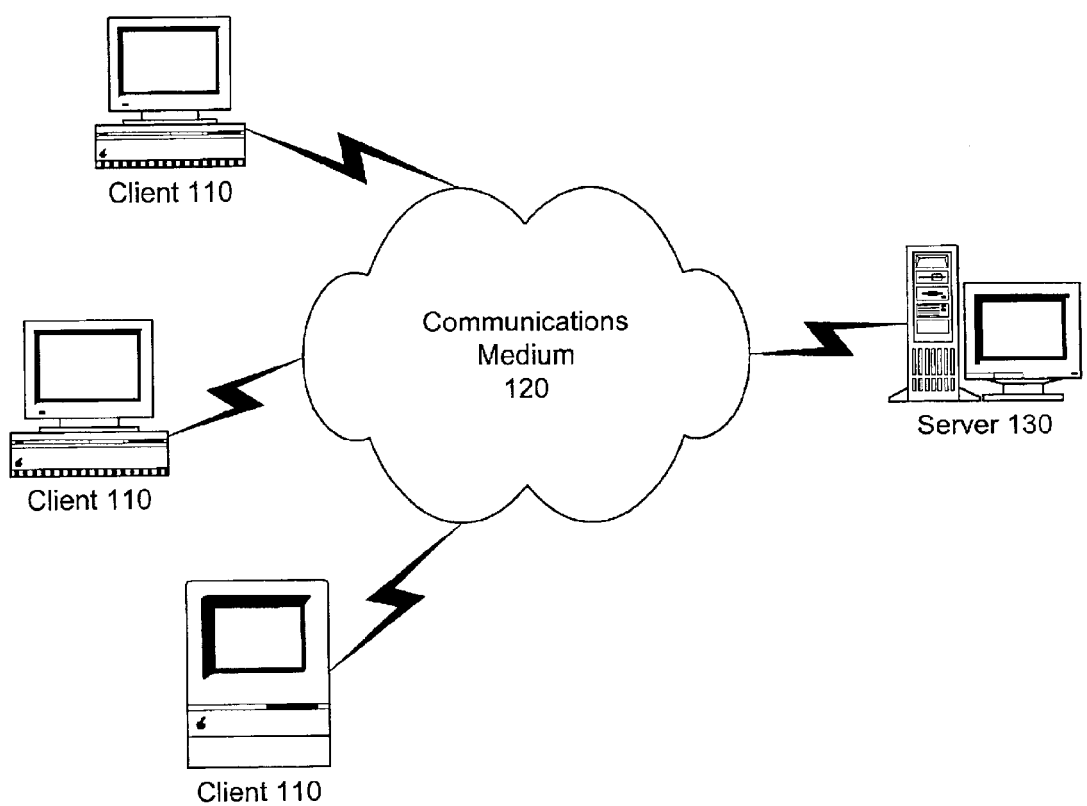
FIG. 1 is an example of a client-server system in which one embodiment of the present invention may be implemented.

Apparatus and methods are described for managing, tracking and controlling page prerequisites. Broadly stated, according to embodiments of the present invention, page prerequisite objects and page sub-component prerequisite objects ensure that conditions for which they are responsible have been met before associated pages and page sub-components, respectively, are permitted to perform a particular action, such as display information to a user. According to one embodiment, a properties data store, such as a properties file, defines the relationships between prerequisite and destination pages and/or destination page sub-components. Advantageously, in this manner, the relationships may be modified using an editor and without requiring recompilation. Additionally, the processing of the prerequisites may be abstracted from the destination pages and destination page sub-components by performing the prerequisite processing by the framework. Thus, reusability is enhanced by the fact that any destination page or destination page sub-component may be taken out of its current context and placed unchanged into any other context, in which it may no longer have any prerequisites or may have different prerequisites.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include one or more machine-readable mediums having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs; EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or on other propagation medium via a communication link (e.g., a modem or network connection). Accordingly, herein, a carrier wave shall be regarded as comprising a machine-readable medium.

Importantly, while embodiments of the present invention will be described with reference to web page processing and Java properties files, the apparatus and methods described herein are equally applicable to various other types of user interfaces and mechanisms for maintaining property/attribute information.

Network Overview

The present invention may be included within a client-server system 100 such as that illustrated in FIG. 1. According to the embodiment depicted in FIG. 1, a server 130 may be communicatively coupled to clients 110 through a communications medium 120, such as a local area network (LAN) or a wide area network (WAN). A representative data connection between the clients 10 and the server 130 includes a direct-dial, bi-directional data connection, which may be telephone (POTS, i.e., "plain old telephone service"), Integrated Services Digital Network (ISDN), digital subscriber line (DSL) or other similar type of connection. Various other data connections between the clients 110 and the server 130 are possible. For example, the connection may be via a network interface card or via a modem pool (not show) such as that conventionally known in the art for providing access to the Internet and private networks. Alternatively, the connection may be established through an Internet service provider (ISP) that allows the clients 110 to exchange information with the server 130.

The server 130 includes a novel prerequisite enforcing framework (not shown) that manages, tracks and controls page and/or page sub-component prerequisites. As will be discussed further below, the server 130 may access a properties data store (not shown), such as a Java properties file, that includes information defining the relationships between prerequisites and destination pages and/or destination page sub-components. Various exemplary software architectures of the prerequisite enforcing framework and preferred syntax and representations of the information in the properties database are described below.

Computer System Overview

Figure 2:
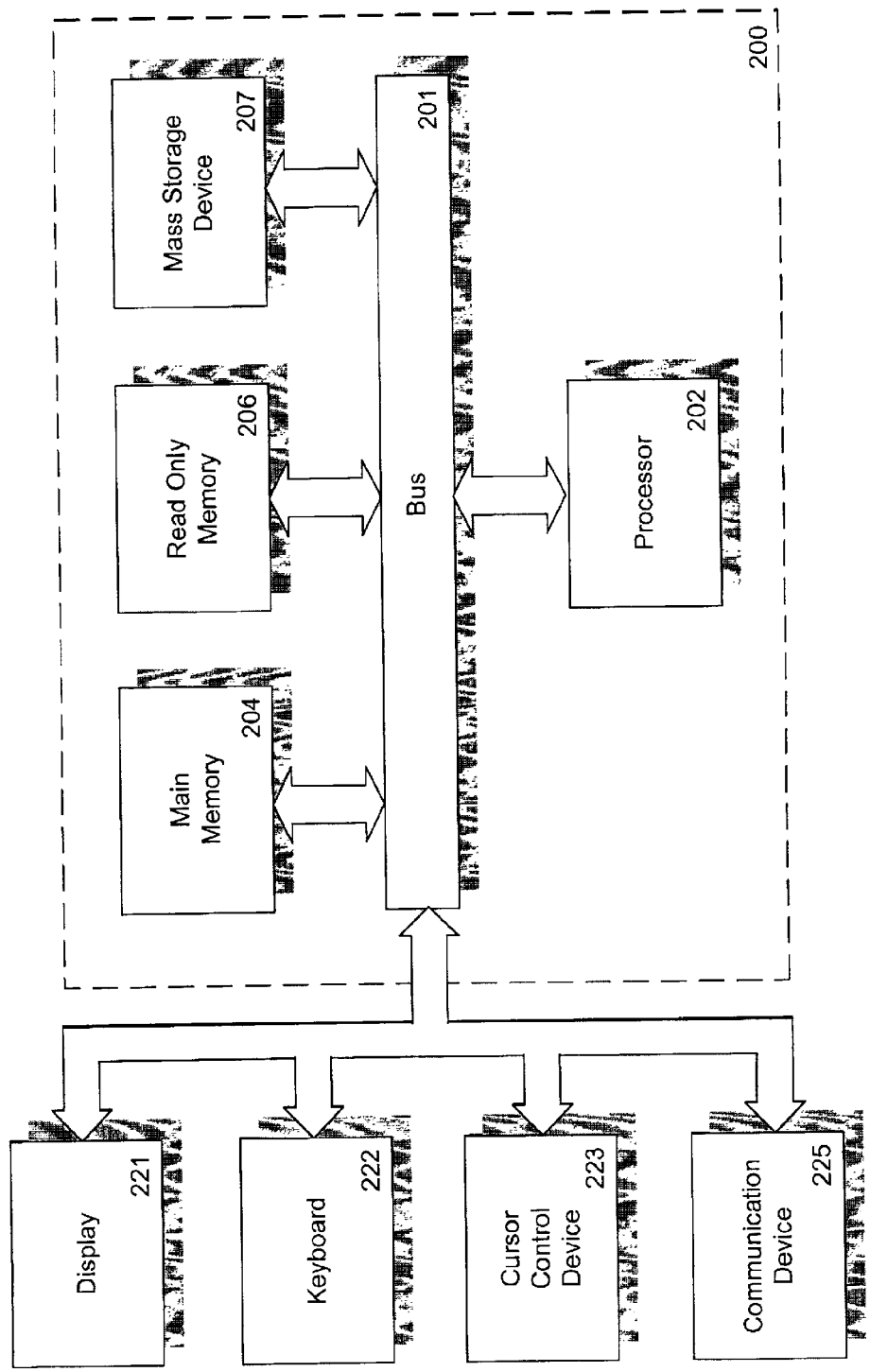
FIG. 2 is an example of a computer system upon which one embodiment of the present invention may be implemented.

A computer system 200 in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to bus 201 for storing information and instructions. Computer system 200 can also be coupled via bus 201 to a display device 221, such as a cathode ray tube (CRT) or Liquid Crystal Display (LCD), for displaying information to a computer user. Typically, an alphanumeric input device 222, including alphanumeric and other keys, may coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for accessing remote servers or other servers via the Internet, for example. The communication device 225 may include a modem, a network interface card, or other well-known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

Exemplary Prerequisite Enforcing Framework

Figure 3:
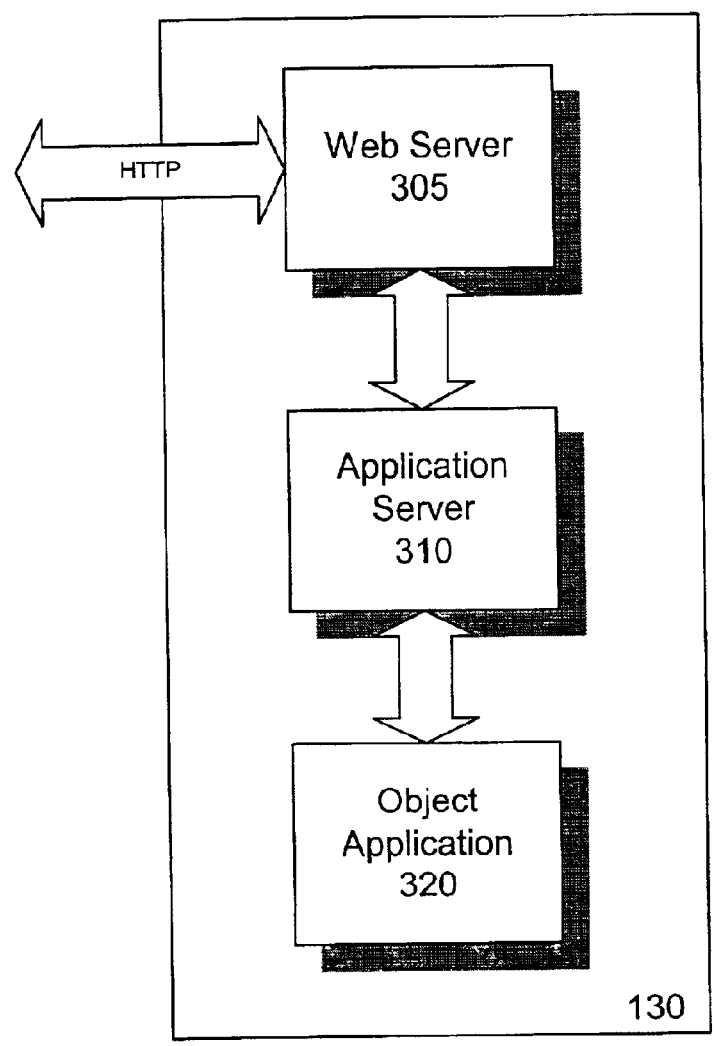
FIG. 3 is a block diagram of a software architecture for a prerequisite enforcing framework according to one embodiment of the present invention.

FIG. 3 is a block diagram of a software architecture for a prerequisite enforcing framework according to one embodiment of the present invention. In the embodiment depicted, the software architecture includes a web server 305, an application server 310, and an object application 320. In one embodiment, the web server 305 acts as a HyperText Transfer Protocol (HTTP) interface between the clients 10 and the application server 310.

The application server 310 appropriately routes requests received from the web server 305 to the object application 320 and conveys output of the object application 320 to the web server 305. For example, in response to page or page sub-component requests, e.g., Uniform Request Locator (URL) requests, the application server 310 (1) determines the appropriate base agent of the object application 320, i.e., the base agent associated with the requested page or page sub-component, (2) creates an instance of the base agent, (3) transfers control to the object application 320 by invoking an execute method of the instantiated base agent, and (4) transfers streamed data, received from the object application 320 that has been generated by a page, page sub-component, page prerequisite, or page sub-component prerequisite, to the web server 305.

The object application 320 provides an abstraction for objects, such as containers and components. According to one embodiment, an object may be thought of conceptually as a hierarchy of potentially nested sub-objects to any number of levels of nesting. The objects and nested sub-objects may be components or containers. Components are leaf nodes in the hierarchy. Containers are non-leaf nodes in the hierarchy and may contain one or more other containers or components. In the embodiments described herein, containers typically represent pages and components of containers represent the pages' sub-components, such as charts, tables, scroll lists, data entry forms, etc.

Architecture of an Exemplary Object Application

Having briefly described an exemplary environment in which the present invention may be employed, a software architecture of the object application 320, according to one embodiment, will now be described with reference to FIG. 4. The architecture depicted seeks to facilitate the management, tracking and controlling of page sub-component prerequisites.

According to this example, the software architecture of the object application 320 includes a base agent 410, a container object 420, and a sub-component prerequisite factory 430. The base agent 410 includes logic to instantiate and execute the container object 420 that corresponds to a page associated with the base agent 410. The base agent 410 receives the page request 400. The container object outputs the sub-component output 480. In one embodiment, the base agent 410 is instantiated by the application server 310 in response to a URL request for the page associated with the base agent 410. Then, the application server 310 causes the requested page to be displayed by invoking the base agent's execute method. The base agent's execute method, in turn calls the execute method of the container object 420.

The container object 420 includes logic to instantiate and execute its sub-objects and determine prerequisites of its sub-objects. The execute method of the container object 420 first determines its sub-objects (e.g., containers and/or components) with reference to a properties data store 440, such as a Java properties file (e.g., "<name>.properties"). Then, for each component, the container object 420 determines what the next prerequisite is for the component by consulting with a special sub-component prerequisite factory object, such as the sub-component prerequisite factory 430. As discussed further below, either the next prerequisite or the component will be added to the container object's list of sub-objects to be displayed. If the container object 420 includes nested containers, when the execute method of the nested containers is invoked, and the nested containers will instantiate and execute their components. When the leaf-level of the hierarchy of objects is reached, those of the components added to the container object's list of sub-objects to be displayed calculate their individual results and stream out these results to the base agent 410.

According to one embodiment, the sub-component prerequisite factory 430 includes a method called "getNextPreReq" that returns either the next prerequisite sub-component object for a specified destination sub-component or null. First, the sub-component prerequisite factory 430 determines what, if any, prerequisite sub-component objects have been associated with the specified destination sub-component. In the example depicted, this operation is accomplished by retrieving information from the properties data store 440, such as the value of a "prereq" property. Second, for each of the prerequisite sub-component objects, the sub-component prerequisite factory 430 determines if the requirements for the prerequisite sub-component have been satisfied. As described further below, in one embodiment, this determination is made by calling a "metReqs" method of the prerequisite sub-component object. In any event, if the sub-component prerequisite factory 430 returns a non-null object, it means the destination sub-component is associated with a prerequisite managed by the prerequisite sub-component object that has not yet been satisfied; and rather than displaying the destination sub-component, the prerequisite sub-component object should be displayed to the user. If a null value is returned by the sub-component prerequisite factory 430, it means that either the specified destination sub-component has no prerequisites or that all the prerequisites for the sub-component have been fulfilled and therefore the destination sub-component may be displayed. Advantageously, according to this novel architecture, the container object 420 is abstracted from the task of prerequisite processing. In alternative embodiments, the container object 420 may be even further abstracted from this process by removing its interface with the properties data store 440 and requiring all access to the properties data store 440 be by way of the sub-component prerequisite factory 430.

The software architecture of the present example also includes page sub-component objects 450, page sub-component prerequisite objects 460, and a status data store 470. The page sub-component objects 450 are each associated with one or more container objects 420. Importantly, the page sub-component objects 450 and the page sub-component prerequisite objects 460 may be coded independently of each other and do not even need to be aware of each other. That is, the page sub-component objects 450 have no knowledge regarding their prerequisites and include no code relating to determining whether or not such prerequisites have been met. Advantageously, by decoupling the sub-component objects from the sub-component prerequisite objects, reusability of the page sub-component objects 450 is greatly enhanced.

The page sub-component prerequisite objects 460 ensure that the conditions for which they are responsible are met. Typically, page sub-component prerequisite objects 460 display information to the user and/or collect some information from the user and ensure the correctness of the collected information. In the embodiment depicted, the page sub-component prerequisite objects 460 store and retrieve the state of their requirements to/from the status data store 470. For example, once a required disclosure is displayed to the user that is a precondition to display of a particular page sub-component object, the associated page sub-component prerequisite object may record that fact in the status data store 470. Then, subsequently, when the particular page sub-component object is requested, its output will be seen rather than that of its page sub-component prerequisite object.

Page Sub-Component Display Processing

Figure 5A:
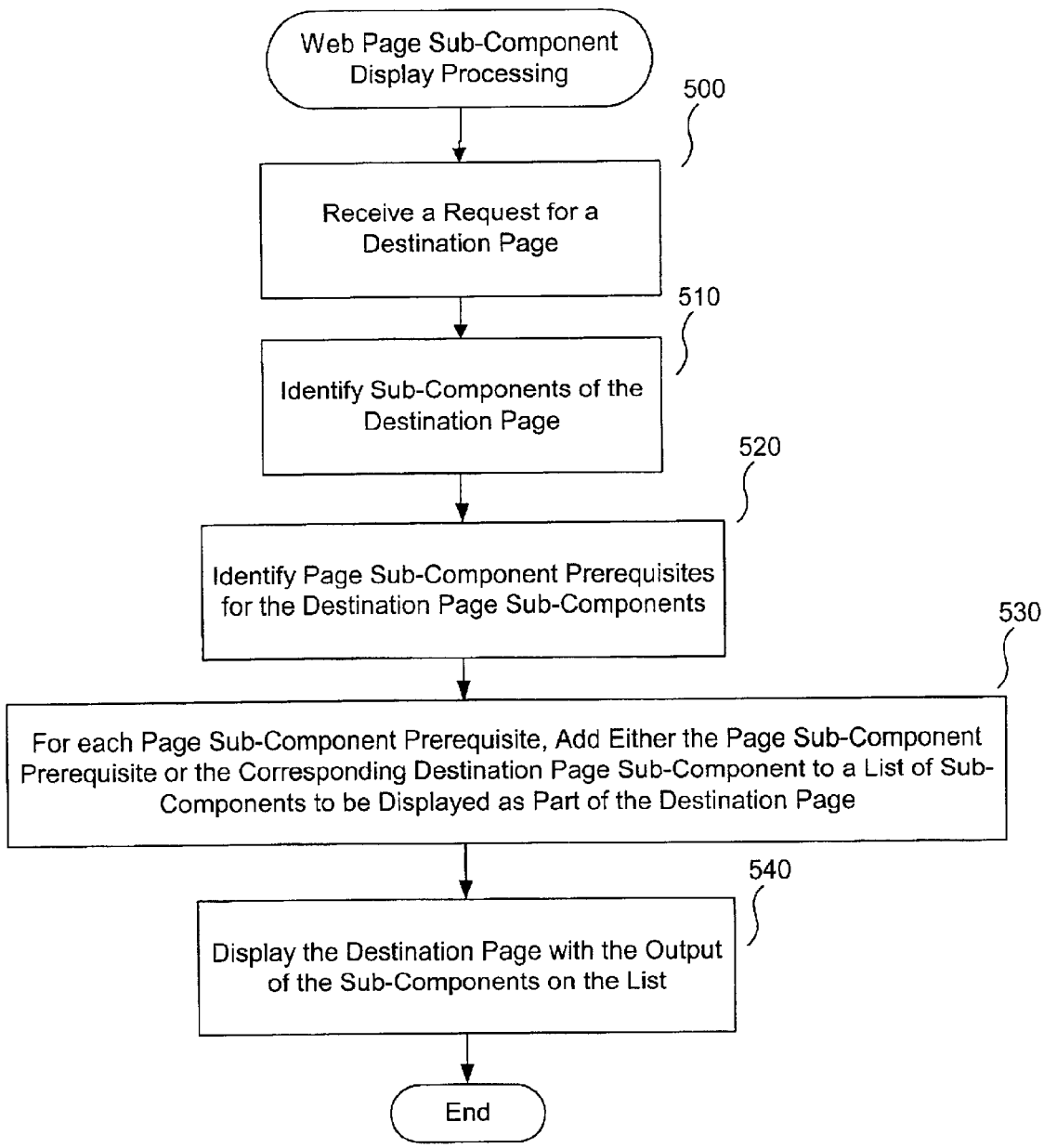
FIG. 5A is a flow diagram illustrating web page sub-component display processing according to one embodiment of the present invention.

FIG. 5A is a flow diagram illustrating web page sub-component display processing according to one embodiment of the present invention. In one embodiment, the processing blocks described below may be performed under the control of a programmed processor, such as processor 202. However, in alternative embodiments, the processing blocks may be fully or partially implemented by any programmable or hardcoded logic, such as Field Programmable Gate Arrays (FPGAs), TTL logic, or Application Specific Integrated Circuits (ASICs), for example.

In the example illustrated, display processing begins at processing block 500 where a request for a destination page, such as an HTTP request, is received by the web server 305 and conveyed to the object application 320 by way of the application server 310.

At processing block 510, the sub-components of the destination page are identified. According to one embodiment, this is accomplished by the container object 420 querying the properties data store 440. In alternative embodiments, the sub-component prerequisite factory 430 may query the properties data store 440.

At processing block 520, the page sub-component prerequisites for the destination page sub-components are identified. As above, depending upon the implementation, this may be accomplished by the sub-component prerequisite factory 430 querying the properties data store 440. In alternative embodiments, the container object 420 may query the properties data store 440. Advantageously, by defining the relationships between prerequisites and destination pages in a data store, no compilation is required when the system administrator modifies those relationships. Rather, if the data store is a text file, it may simply be modified by an editor.

At processing block 530, an appropriate sub-component object (either a page sub-component objects or a page sub-component prerequisite object 460) is added to the destination page's list of sub-component objects to display for each sub-component identified in processing block 510. According to one embodiment, the container object 420 calls the "getNextPreReq" method for each of the page sub-components of the destination page and adds the either the object returned (a page sub-component prerequisite object) or the page sub-component object to the destination page's list for subsequent display. According to one embodiment, the "getNextPreReq" method sequentially checks page sub-component prerequisites of the specified page sub-component in an order indicated by the properties data store and returns the first page sub-component prerequisite that has one or more requirements that are not satisfied. Advantageously, in this manner, hierarchical relationships of prerequisites may be defined easily.

Finally, at processing block 540, the destination page is displayed with the appropriate page sub-component outputs and appropriate page sub-component prerequisite outputs by causing each of the sub-component objects on the destination page's list to stream its output to the base agent 410.

Figure 5B:
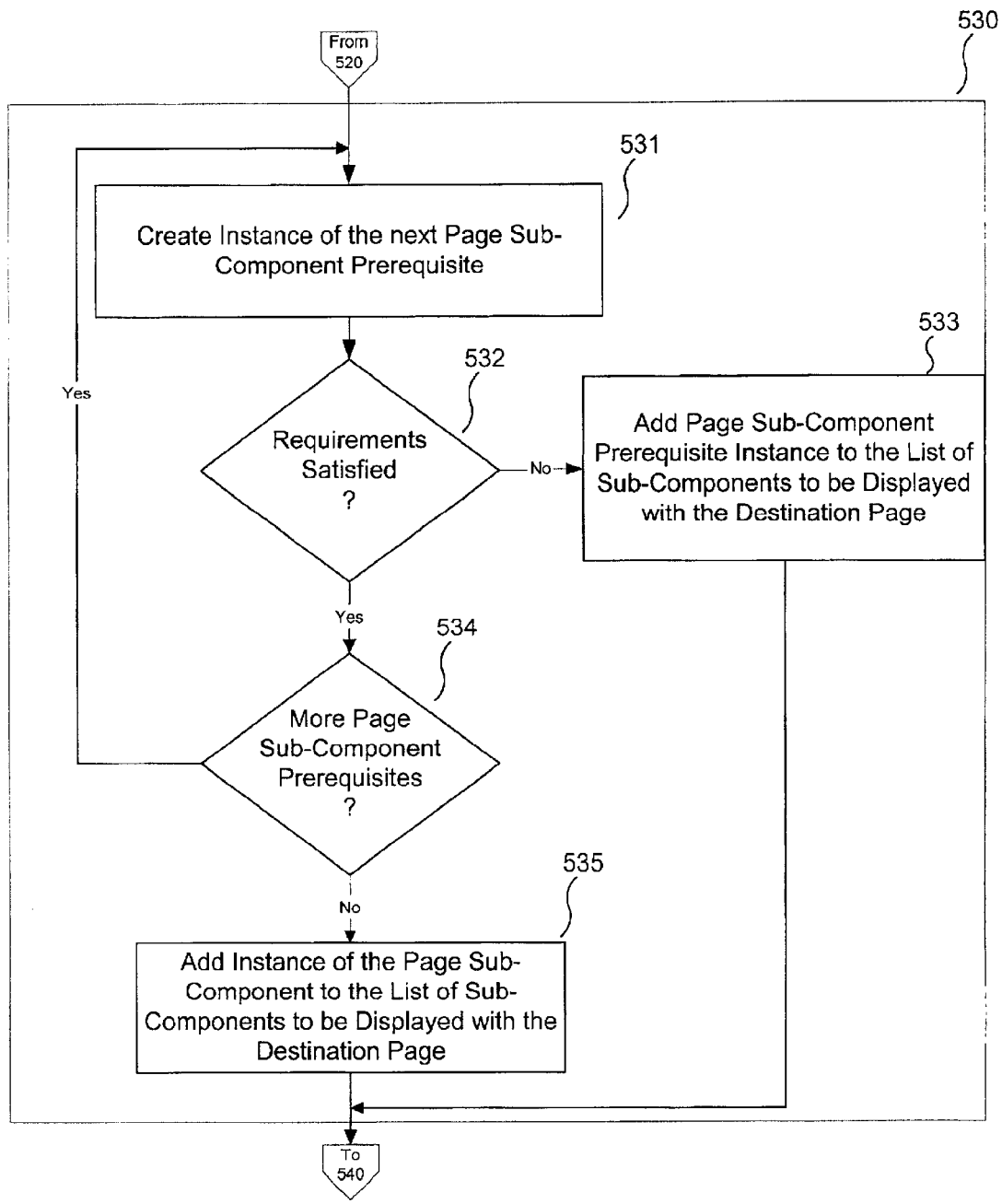
FIG. 5B is a flow diagram illustrating processing block 530 of FIG. 5A according to one embodiment of the present invention.

FIG. 5B is a flow diagram illustrating processing block 530 of FIG. 5A according to one embodiment of the present invention. In this example, the goal is to find the first page sub-component prerequisite object associated with the specified page sub-component object that has one or more unmet requirements. At processing block 531, an instance of the next page sub-component prerequisite object is created by the sub-component prerequisite factory 430. Then, the sub-component prerequisite factory 430 determines if the page sub-component prerequisite object's requirements have been satisfied, at decision block 532, by invoking a method of the newly created instance, such as a "metReqs" method that all page sub-component prerequisite objects may implement. If all the page sub-component prerequisite object's requirements have been met, then flow continues with decision block 534; otherwise processing branches to processing block 533.

At processing block 533, since it has been determined that one or more requirements of the page sub-component prerequisite object has not been met, the instance of the page sub-component prerequisite object is returned by the sub-component prerequisite factory 430 and added to the destination page's list. In this example, after the first page sub-component prerequisite object has been found with one or more unsatisfied requirements (i.e., after processing block 533), control returns to processing block 540.

At decision block 534, a determination is made whether or not there are more page sub-component prerequisites. If so, processing continues with processing block 531. If not, no page sub-component prerequisite objects have been found that have unmet requirements; and processing continues with processing block 535. At processing block 535, because either the specified page sub-component has no page sub-component prerequisites or all have been satisfied, an instance of the specified page sub-component is added to the destination page's list.

Architecture of Another Exemplary Object Application

Figure 6:
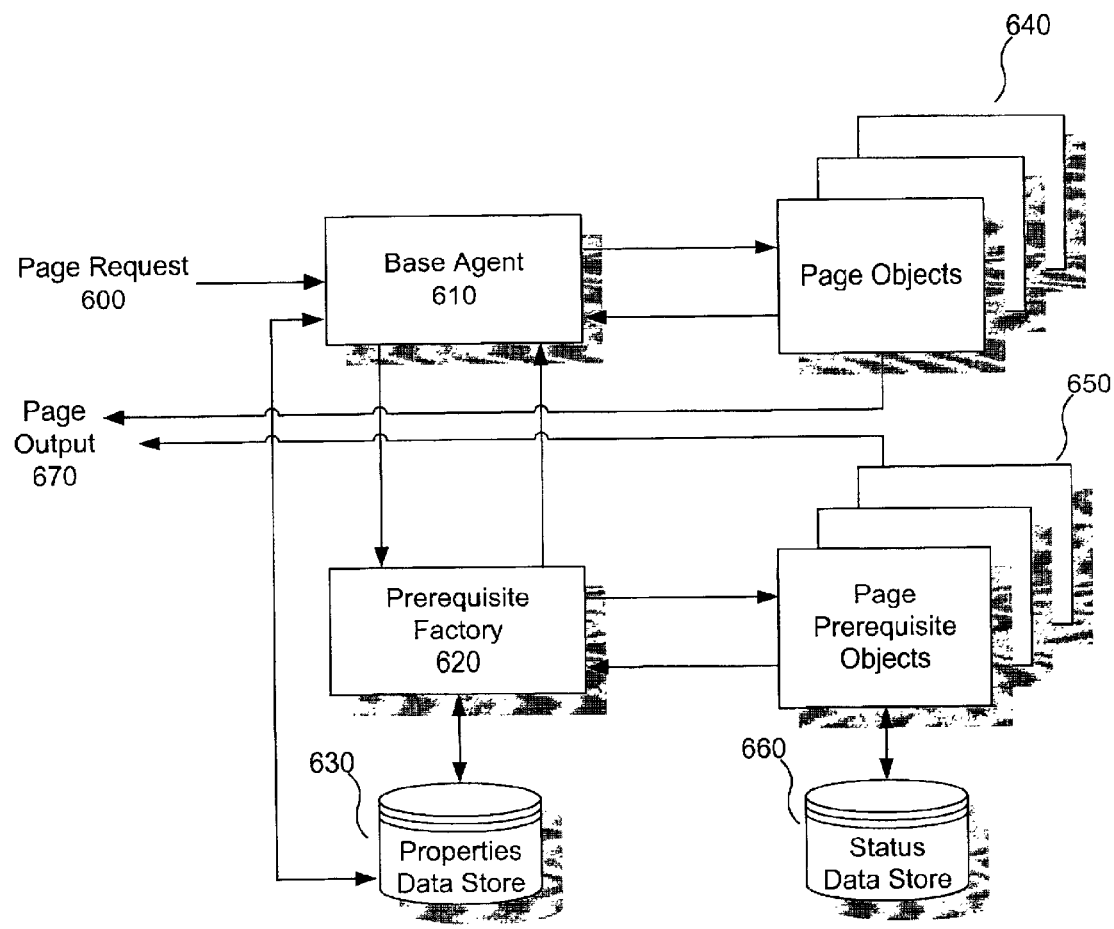
FIG. 6 is a block diagram of a software architecture for an object application according to another embodiment of the present invention.

FIG. 6 is a block diagram of software architecture for an object application according to another embodiment of the present invention. The architecture depicted seeks to facilitate the management, tracking and controlling of page prerequisites. According to this example, the software architecture of the object application 320 includes a base agent 610, a prerequisite factory 630, page objects 640, page prerequisite objects 650, a properties data store 630, and a status data store 660. Base agent 610 receives page request 600. Page objects 640 and/or page prerequisite objects 650 output the page output 670.

The base agent 610 includes logic to determine which page object is responsible for streaming out the content of the destination page based upon predetermined properties stored in the properties data store 630 and/or the specified URL. According to one embodiment, when the user requests the destination page by selecting a link or specifying a URL, for example, in the client browser, the request is passed to the application server 310 via the web server 305. Then, the application server 310 determines the appropriate base agent 610 for the specified URL, creates an instance of the base agent 610, and calls the execute method of the base agent 610. After the base agent 610 has determined the appropriate page object associated with the URL, it consults with the prerequisite factory 620 to determine what the next prerequisite is for the page object. If there are no prerequisites or all the prerequisites have been satisfied then the base agent 610 creates an instance of the page object and executes it to cause the object to stream its output to the display. However, if a prerequisite is returned by the prerequisite factory 620, then the base agent 610 instead executes the page prerequisite object causing the prerequisite object to stream its output to the display.

According to one embodiment, the prerequisite factory 620 includes a method called "getNextPreReq" that returns either the next page prerequisite object for a specified destination page or null. First, the prerequisite factory 620 determines what, if any, page prerequisite objects 650 have been associated with the specified destination page. In the example depicted, this operation is accomplished by retrieving information from the properties data store 630, such as the value of a "prereq" property. Second, for each of the page prerequisite objects identified, the prerequisite factory 620 determines if the requirements for the page prerequisite object have been satisfied. As described further below, in one embodiment, this determination is made by calling a "metReqs" method of a "decider" component of the page prerequisite object. Because pages may have multiple sub-components, it is preferable to designate one as a decider component that can be used to determine whether or not the conditions for which it is responsible have occurred. In any event, if the prerequisite factory 620 returns a non-null object, it means the destination page is associated with a prerequisite managed by the page prerequisite object that has not yet been satisfied; and rather than displaying the destination page, the page prerequisite object should be displayed to the user. If a null value is returned by the prerequisite factory 620, it means that either the specified destination page has no prerequisites or that all the prerequisites for the destination page have been fulfilled and therefore the destination page may be displayed. Advantageously, according to this novel architecture, the base agent 610 is abstracted from the task of prerequisite processing. In alternative embodiments, the base agent 610 may be even further abstracted from this process by removing its interface with the properties data store 440 and requiring all access to the properties data store 630 be by way of the prerequisite factory 620.

As above, the page objects 640 and the page prerequisite objects 650 may be coded independently of each other and do not even need to be aware of each other. Thus, reusability is enhanced because the page objects 640 and the page prerequisite objects 650 are decoupled thereby allowing page objects 640 to be easily taken out of the current context and placed unchanged into a new context.

The page prerequisite objects 650 ensure that the conditions for which they are responsible are met. Typically, page prerequisite objects 650 display information to the user and/or collect some information from the user and ensure the correctness of the collected information. In the embodiment depicted, the page prerequisite objects 650 store and retrieve the state of their requirements to/from the status data store 660. For example, once a required disclosure is displayed to the user that is a precondition to display of a particular page object, the associated page prerequisite object may record that fact in the status data store 660. Then, subsequently, when the particular page object is requested, its output will be seen rather than that of its page prerequisite object.

Figure 4:
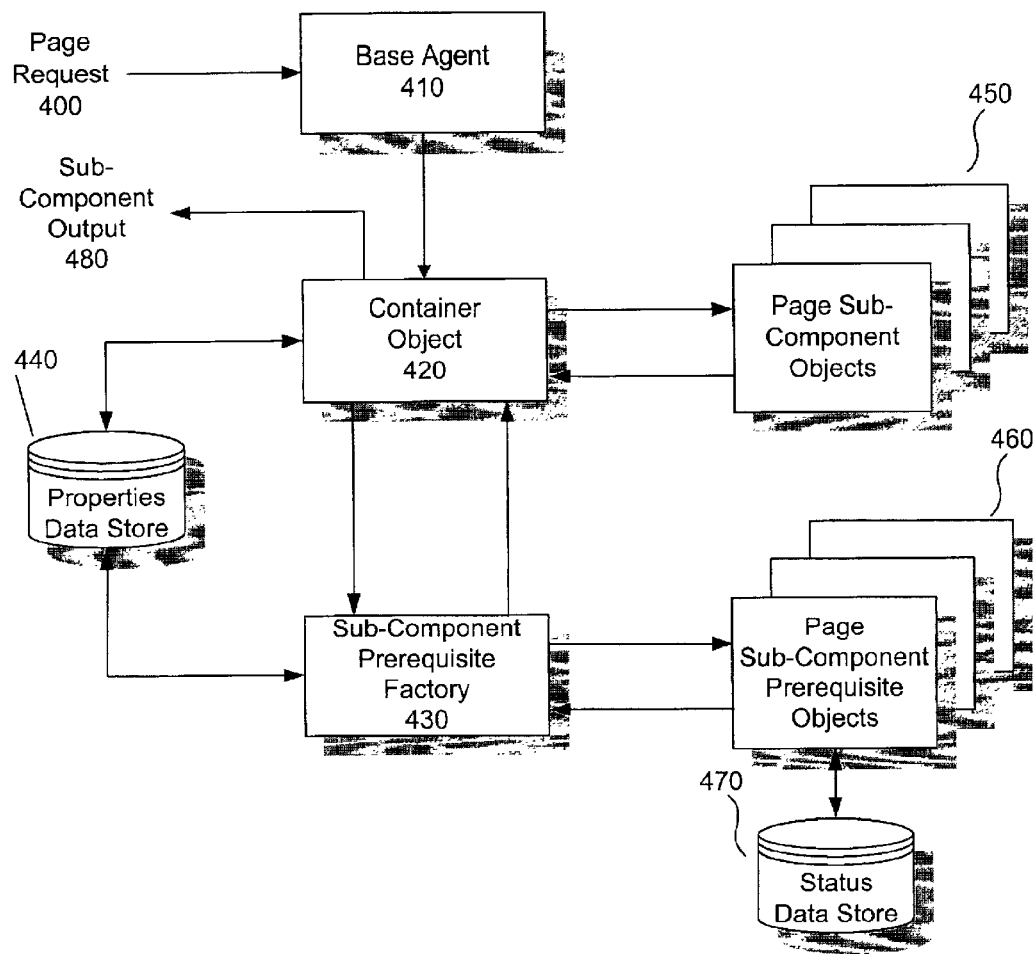
FIG. 4 is a block diagram of a software architecture for an object application according to one embodiment of the present invention.

Importantly, the exemplary software architectures depicted in FIGS. 4 and 6 are not mutually exclusive. Rather, it is anticipated that depending upon the particular implementation either or both page sub-component prerequisites and page prerequisites may be used in the context of the same user interface for purposes of achieving the desired objectives.

Page Display Processing

Figure 7A:
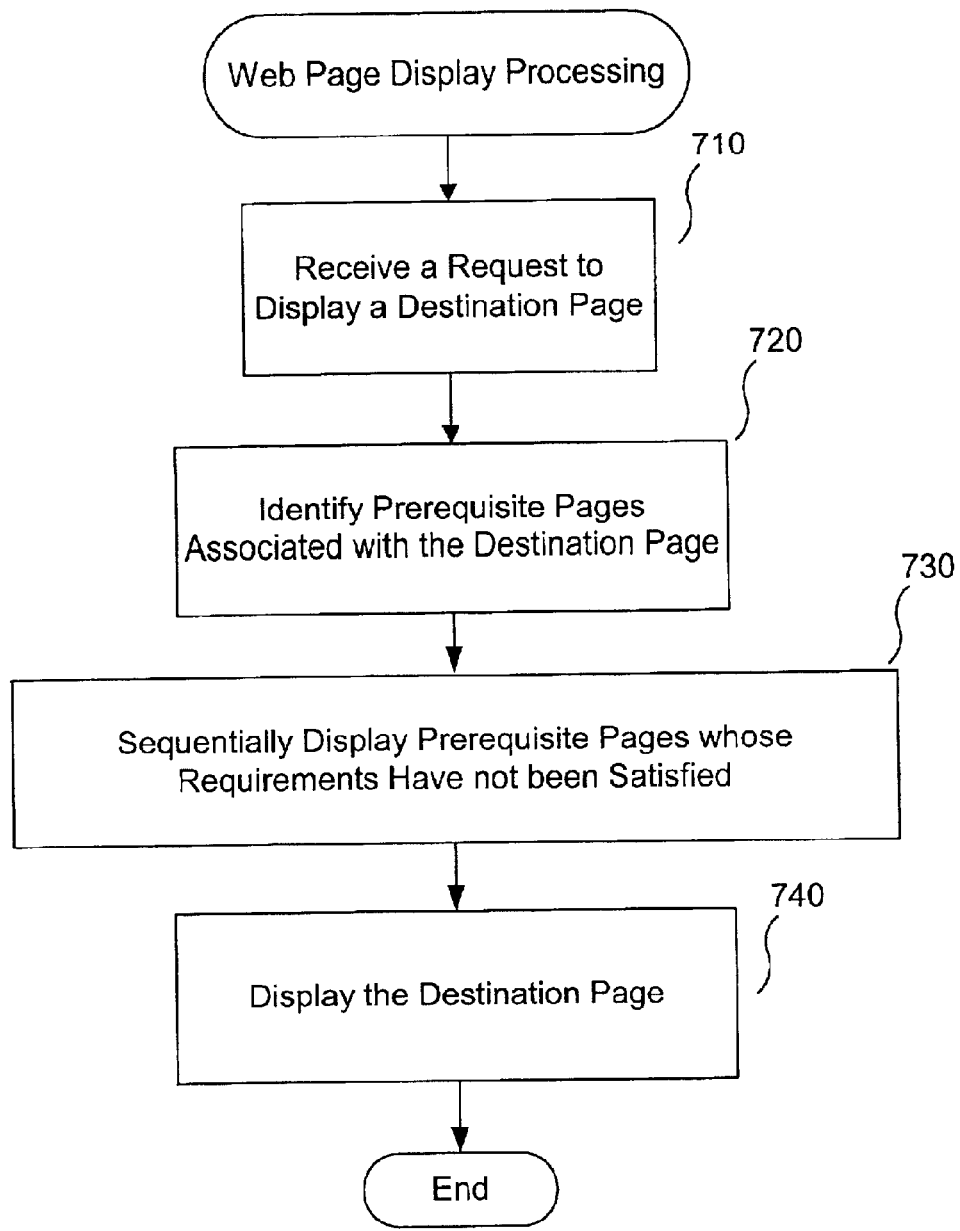
FIG. 7A is a flow diagram illustrating web page display processing according to one embodiment of the present invention.

FIG. 7A is a flow diagram illustrating web page display processing according to one embodiment of the present invention. In one embodiment, the processing blocks described below may be performed under the control of a programmed processor, such as processor 202. However, in alternative embodiments, the processing blocks may be fully or partially implemented by any programmable or hardcoded logic, such as Field Programmable Gate Arrays (FPGAs), TTL logic, or Application Specific Integrated Circuits (ASICs), for example.

In the example illustrated, display processing begins at processing block 710 where a request for a destination page, such as an HTTP request, is received by the web server 305 and conveyed to the object application 320 by way of the application server 310.

At processing block 720, the page prerequisite objects for the destination page are identified. According to one embodiment, this is accomplished by the base agent 610 calling the "getNextPreReq" method of the prerequisite factory 620, which, in turn, queries the properties data store 630. Again, the advantage of defining relationships between prerequisites and destination pages in a data store is the fact that no compilation is required when the system administrator modifies those relationships.

At processing block 730, prerequisite page objects that have one or more requirements that are not fulfilled are displayed sequentially until all prerequisite page objects' requirements are satisfied. According to one embodiment, the "getNextPreReq" method sequentially checks page prerequisite objects associated with the destination page in an order indicated by the properties data store 630 and returns the first page prerequisite object that has one or more requirements that are not satisfied thereby facilitating definition of hierarchical relationships among page prerequisite objects and page objects.

Finally, after all the page prerequisite objects' requirements have been satisfied at processing block 740, the destination page is displayed.

Figure 7B:
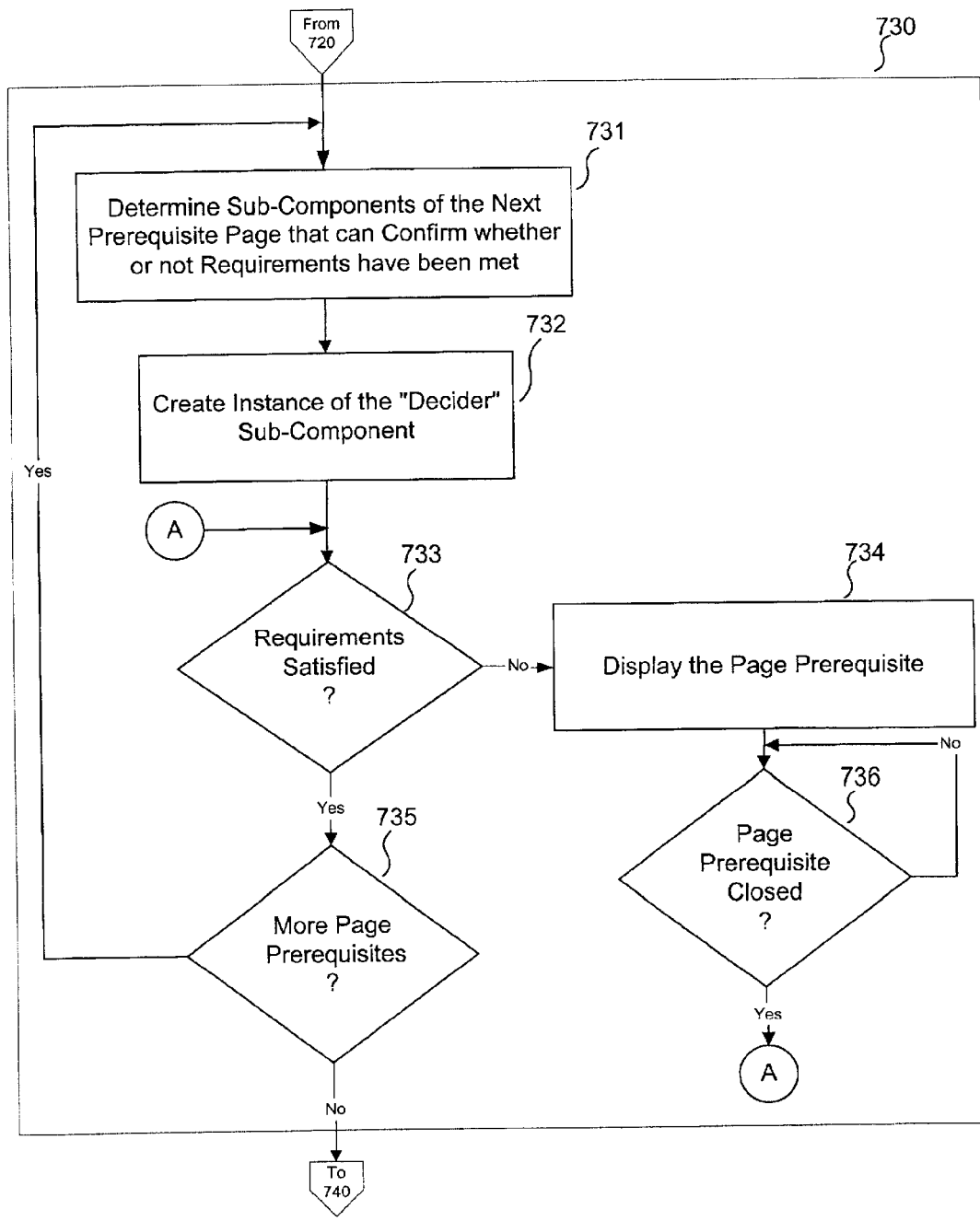
FIG. 7B is a flow diagram illustrating processing block 730 of FIG. 7A according to one embodiment of the present invention.

FIG. 7B is a flow diagram illustrating processing block 730 of FIG. 7A according to one embodiment of the present invention. In this example, the goal is to find the first page prerequisite object associated with the specified page object that has one or more unmet requirements. At processing block 731, the "decider" sub-component of the next page prerequisite object is determined. Again, the decider is the sub-component of the page prerequisite object that is responsible for communicating whether or not the page prerequisite object's requirements have been met. According to one embodiment, the decider sub-component is determined by the prerequisite factory 620 querying the properties data store 630 for the "decider" property of the page prerequisite object.

At processing block 732, an instance of the "decider" sub-component is created. According to one embodiment, a special method is made available to allow creation of the page prerequisite object for the purpose of checking if the requirements have been met. Alternatively, the standard create method may be called with a control flag indicating the purpose of the create call, e.g., check prerequisites vs. true creation. At any rate, at decision block 733, the prerequisite factory 620 determines if the page prerequisite object's requirements have been satisfied by invoking a method of the newly created instance, such as a "metReqs" method that preferably all "decider" sub-components implement. If all the page prerequisite object's requirements have been met, then flow continues with decision block 735; otherwise processing branches to processing block 734.

At decision block 735, a determination is made whether or not there are more page prerequisite objects associated with the destination page. If so, processing continues with processing block 731. If not, no page prerequisite objects have been found that have unmet requirements; and processing continues with processing block 740.

At processing block 734, since it has been determined that one or more requirements of the page prerequisite object has not been met, the output of the prerequisite page is streamed to the display. Therefore, in this example, after the first page prerequisite object has been found with one or more unsatisfied requirements that page is displayed rather than the destination page selected by the user. In one embodiment, because the decider sub-component has already been instantiated, an optimization involves the framework saving the decider object created during the metReqs call so that it does not have to be recreated when the prerequisite page object is executed.

At decision block 736, a determination is made whether or not the page prerequisite has been closed. If so, control branches to decision block 733. If not, control loops back to decision block 736 thereby preventing the destination page from being displayed until the requirements of the prerequisite page object have been fulfilled.

Properties File Syntax Enhancements

Before describing various improvements to existing properties file syntax, it may be instructive to briefly discuss the current usage model of such files with referent to FIG. 8. Java has a special built-in mechanism for handling internalization. Locale specific properties/attributes are placed in files having a ".properties" extension (herein referred to as a "properties file"). The properties file contains one or more lines of attribute name value pairs (hereinafter "attribute-value pairs") in the general form represented by expression 810. The first portion of the attribute-value is an attribute name, such as "prompt1", as illustrated in expression 820. The attribute name is followed by an equal sign. The final portion of the attribute value pair comprises a string value, such as "please enter your name", as illustrated in expression 820, to be associated with the particular attribute. In the Java framework, properties files may be loaded into objects of type "ResourceBundle". Then, the resulting resource bundle objects may be queried to determine a value associated with a particular attribute of interest. For example, if a properties file contained the line:

$$Abc.def.gh\_I=j$$

then invoking the appropriate resource bundle object's get method, e.g., resourceBundle.getString ("Abc.def.gh_I") would return the string value "j". In this manner, applications can query the value of an attribute during runt time. However, one limitation of this prior art syntax is that both properties files and the corresponding internal resource bundle representations are flat, non-object oriented collections of key-value pairs. In connection with an object-oriented implementation of page sub-component prerequisites, page prerequisites, and/or other applications, the assignee of the present invention has found it to be advantageous to (1) allow properties/attributes to be defined and accessed on an object basis; (2) enable inheritance of properties/attributes through some hierarchy of objects; (3) specify and override properties/attributes of objects as they are used in different contexts, and (4) enable inheritance of contexts.

Definition and Access of Properties on an Object-by-Object Basis

FIG. 9 illustrates an improved properties file syntax that enables definition and access of properties on an object-by-object basis according to one embodiment of the present invention. According to the embodiment depicted, a properties data store, such as a properties file, may include attribute-value pairs according to the general form represented by expression 910. The first portion of the attribute-value pair is a string value representing an attribute name, such as "prompt1". Expression 910 further includes a string value representing an object name, followed by a delimiter, such as '.'. As above, the attribute name is followed by an equal sign. Finally, a value to be associated with the particular object attribute is specified in the form of a string value. While preferably, for readability, the delimiter that separates the object name and the attribute name is a non-alphanumeric printable ASCII character, in alternative embodiments other single or multiple character delimiters may be employed.

The syntax represented by expression 910 allows one or more attribute-value pairs to represent what is referred to herein as a "properties file object" or simply an object. For example, attribute-value pairs 920 and 930 together define a properties file object called "Obj1" having two attributes, attr1 and attr2. Similarly, attribute-value pairs 940 and 950 specify a properties file object named "Obj2" that also includes two attributes, attr1 and attr3. Attribute-value pair 920 associates the value, wa11, with the attribute named attr1 of object, Obj1. Likewise, attribute-value pairs 930, 940, 950, and 960, associate val12, val21, val23, and "please enter your name" with attr2, attr1, attr3, and prompt1 of Obj1, Obj2, Obj2, and Trading, respectively.

Importantly, this improved syntax is fully compliant with standard Java properties files thereby making this syntax enhancement transparent to Java. To Java, the attribute-value pairs 920, 930, 940, and 950 have no additional meaning. Rather, Java will interpret them as simply representing four independent attribute-value pairs. For example, Java interprets the attribute-value pair 920 as the value, val11, being associated with an attribute named "Obj1.attr1". Similarly, attribute-value pairs 930, 940 and 950, respectively, are interpreted as the value, val12, being assigned to "Obj1.attr2", the value, val21, being assigned to an attribute named "Obj2.attr1", and "Obj2.attr3" being associated with a value of val23. Consequently, as described further below, the syntax enhancements discussed herein may be implemented on top of standard Java properties file semantics by supplying the standard Java Application Programming Interfaces (APIs) and/or resource bundle methods with attribute names that include appropriate delimiters to separate the object name from the attribute name.

Inheritance of Properties

Currently, inheritance is not supported by the flat, non-object oriented structure of properties files. Therefore, the concept of a base object (e.g., an object upon which other objects may be built) does-not exist. If common attributes are required in a properties file, they must be replicated as many times as necessary. Unfortunately, such replication becomes problematic when changes become necessary to the common attributes since each change must be accurately performed for each of the replicated attributes.

FIG. 10 illustrates an improved properties file syntax that enables inheritance of properties according to one embodiment of the present invention. In this example, a special attribute-value pair having the form of expression 1010 is provided. A first portion of the special attribute-value pair representing an object name is separated from a special attribute name, "extends", by a delimiter. The "extends" attribute is used to specify inheritance from the object specified on the right hand side of the equal sign.

As illustrated by attribute-value pairs 1020, 1030, 1040, 1050, and 1060, this mechanism allows attributes and values of objects to be inherited by other objects; and the other objects may each override the value of an inherited attribute as well as add its own attributes and values. In the present example, two "properties file objects" are defined, Obj1 and Obj2. Obj1 and its associated attributes and values are defined by attribute-value pairs 1020 and 1030. Obj2 and its associated attributes and values are defined by attribute-value pairs 1040, 1050, and 1060. The use of the special attribute name "extends" in attribute-value pair 1040 causes Obj2 to extend Obj1. That is, Obj2 inherits all the attributes of Obj1. Additionally, in this example, attribute-value pair 1050 overrides the value of attr2 of Obj2 with val22. Finally, attribute-value pair 1060 specifies that Obj2 has an attribute, attr3, in addition to those specified for Obj1, which is assigned the value val23.

Advantageously, this novel inheritance syntax saves time for the person specifying attributes. For example, in a system in which two or more objects have many attributes and values in common, the common attributes need only be specified once in a base object. Then, extending objects need only specify overridden values or new attributes and values. Thus, by employing the inheritance mechanism described herein, time savings proportionate to the-commonality of attributes among objects of a system can be achieved during specification of the attributes.

This notation also facilitates maintainability of properties files in which it is employed. Rather than replicating common attributes among many objects as would be required in a non-hierarchical environment that lacks a mechanism for inheritance, such as that imposed by current properties file syntax, the notation of FIG. 11 facilitates modification of object attributes and/or attribute values by allowing common attributes to be specified in base objects. As a result, a change to a particular common attribute is localized to the base object that specifies that common attribute; and semantically this change is automatically accomplished for all sub-objects (e.g., extending objects) that inherit from the modified base object.

While the special attribute name "extends" has been chosen to enhance the readability and understandability of the properties file, the invention is not limited to any particular naming convention. Thus, in alternative embodiments, the name "extends" may be replaced with other names, such as "inheritsfrom", "isa", or other arbitrary string values.

Specification and/or Overriding of Object Properties in Different Contexts

FIG. 11 illustrates an improved properties file syntax that enables the specification and/or overriding of object properties as they are used in different contexts according to one embodiment of the present invention. In this example, the syntax of an attribute-value pair may include a context name, an object name, and an attribute name as illustrated by expression 1110. The context may represent a current state of a system, a top level container, a sub-container, a page, or other objects or circumstances useful for interpreting a particular object. In the examples described herein, the context is typically a user interface screen, such as a web page.

importantly, this enhanced syntax provides for context sensitive overriding of properties file object attributes. In the present case, attribute-value pairs 1120 and 1130 define an object, Obj1, having attr1 and attr2. The value of attr1 is always val11. However, as a result of the attribute-value pair 1140, the value of attr2 is val12 except when Obj1 is running in the context of Page1 in which case the value of attr2 is val112. Therefore, assuming an object has the ability to determine its context, a mechanism is provided by the syntax of expression 1110 for context sensitive overriding of attributes of objects.

While, in the examples illustrated herein, the context name, object name, and attribute name appear in a specific order relative to each other within attribute-value pairs, the invention is not limited to any particular ordering of these names. Consequently, in other embodiments, alternative orderings of these names may be used.

Inheritance of Contexts

FIG. 12 illustrates an improved properties file syntax that enables inheritance of contexts according to one embodiment of the present invention. The concept enabled by this syntax enhancement is similar to that of FIG. 10 with reference to which inheritance of attributes of properties file objects was illustrated. However, here, the properties file object is a context. Since a context is just a properties file object, any context may be extended and any contexts' attributes may be overridden or added as discussed earlier.

In the present example, properties files may include attribute-value pairs having the form of expression 1210, which includes a context name, a special attribute name, "extends", and an indication of the context to be extended (e.g., the context from which to inherit objects and/or attributes). Attribute-value pairs 1220 and 1230 indicate that normally, or by default, the value of attribute attr2 of Obj1 is val12. However, attribute-value pair 1240 overrides the definition of attr2 of Obj1 when Obj1 is running in the context of Page1. Attribute-value pairs 1250 and 1260 specify a context, Page2, that includes all the objects and attributes of Page1 but overrides the value of attr2 of Obj1 when Obj1 is running in the context of Page2. Thus, the value of attr2 of Obj1 may have one of three values depending upon its current context. For example, when the context is Page1, attr2 is val112; when the context is Page2, attr2 is val212; otherwise, attr2 is val12.

Property Retrieval Processing

Figure 13:
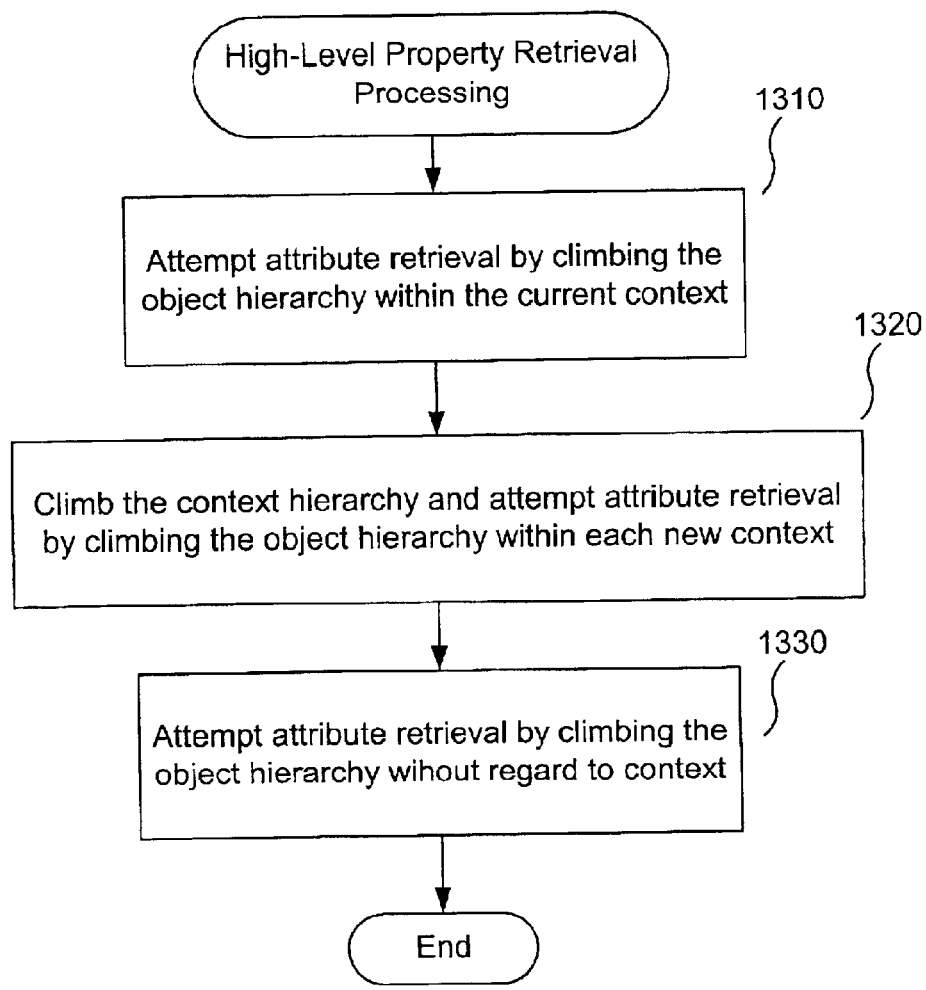
FIG. 13 is a high-level flow diagram that conceptually illustrates property retrieval processing according to one embodiment of the present invention.

FIG. 13 is a high-level flow diagram that conceptually illustrates property retrieval processing according to one embodiment of the present invention. For simplicity the present example has been broken down into three stages: (1) a first stage in which the object hierarchy is traversed for a fixed context, (2) a second stage in which both context hierarchy traversal and object hierarchy traversal are performed, and (3) a third stage in which context is disregarded during object hierarchy traversal.

In the embodiment depicted, the property retrieval process begins at processing block 1310. Processing block 1310 is representative of the first stage of the three stages. During processing block 1310, an attempt is made to retrieve a specified attribute by climbing a specified object hierarchy (presumably created by the inheritance mechanisms described earlier) with which the attribute is thought to be associated. If a value for the specified attribute is located during this stage, processing is complete; otherwise processing proceeds with processing block 1320 (the second stage). At processing block 1320, the context is no longer held fixed as in processing block 1310. Rather, the context hierarchy is climbed to search parent contexts. Within each context, every level of the specified object hierarchy is also searched until the desired value is located or the levels are exhausted. Again, if the desired value is found, processing may cease at this point; otherwise, a final attempt is made to retrieve the value of the specified attribute in processing block 1330. During processing block 1330 (the third stage), context is ignored; and a final search is made for the desired value by climbing the object hierarchy without regard to the current context.

Figures 14A, 14B:
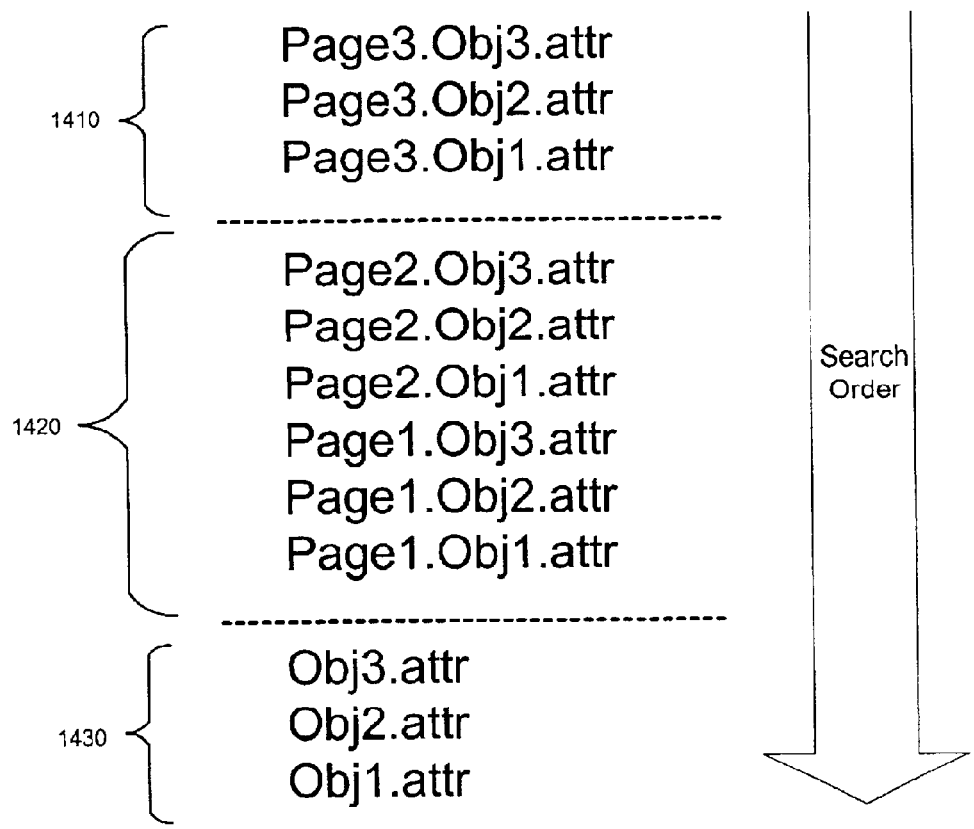
FIG. 14A is an exemplary context and object hierarchy.
FIG. 14B illustrates property retrieval processing according to the object and context hierarchy of FIG. 14A and the processing of FIG. 13.

FIG. 14A is an exemplary context and object hierarchy. In this example, the properties file defines the following object hierarchy: Obj3 extends Obj2 which extends Obj1, and the following context hierarchy Page3 extends Page2 which extends Page1.

FIG. 14B illustrates property retrieval processing according to the object and context hierarchy of FIG. 14A and the processing of FIG. 13. Suppose an object of type Obj3 running in the context of Page3 wants to get the value of its attribute, attr. According to the search approach described with reference to FIG. 13, the object will look for a value of attr in the order shown in FIG. 14B. The retrieval process will stop as soon as one of the requested attributes is located in the properties file or resource bundle representation.

First, the object will attempt to locate the value of attr by searching a first group of attribute-value pairs 1410. More specifically, the object will first look in its current context, e.g., by calling its getValue ( ) method with the string value "Page3.Obj3.attr". If the value of attr for Obj3 is not overridden by Page3, then the object will begin climbing its hierarchy. In this example, the object will look to its parent, Obj2, to see if a value has been associated with attr, e.g., by making the call getValue ("Page3.Obj2.attr"). If this retrieval is unsuccessful, e.g., returns a null value, then a final attempt within the current context will be made to retrieve the desired value from Obj1.

Assuming the desired value was not found during the first stage. The search continues into a second group of attribute-value pairs 1420. The search of the second group 1420 represents the second stage where an attempt is made to locate the object's attribute by climbing the object's hierarchy in the parent context, Page2, until a level is found in which the attribute is assigned a value or until the levels are exhausted. The search proceeds as above, climbing the object hierarchy within the current context, Page2. Once the object hierarchy has been exhausted, however, the search continues with the parent of the current context, Page1.

Again, assuming the desired value was not located by a previous stage, the search enters a final stage 1430 in which context is disregarded and the object hierarchy is traversed. First the object determines if it has defined a value for attr, e.g., by making the call getValue("Obj3.attr"). If this call is unsuccessful, then a subsequent retrieval is made with reference to the object's parent, Obj2. If that call fails, a final attempt to retrieve the desired value will be made with reference to Obj2's parent, Obj1, e.g., by calling getValue ("Obj1.attr").

Figure 15:
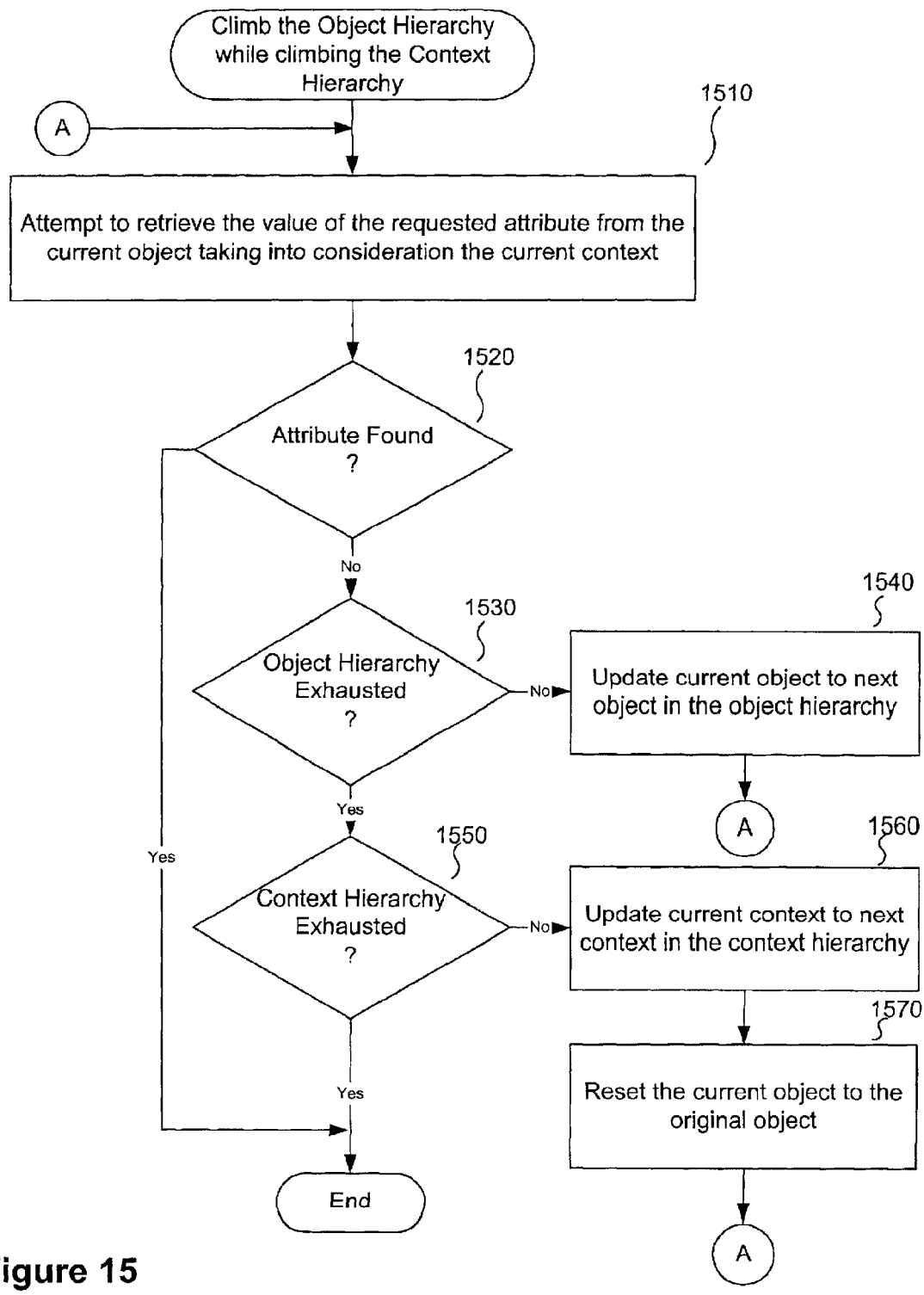
FIG. 15 is a flow diagram illustrating processing associated with traversal of an object hierarchy and a context hierarchy according to one embodiment of the present invention.

FIG. 15 is a flow diagram illustrating processing associated with traversal of an object hierarchy and a context hierarchy according to one embodiment of the present invention. According to this embodiment, the first and second stages of the search processing are combined into a single stage. At processing block 1510, an initial attempt is made to retrieve the value of the requested attribute from the current object while taking into consideration the current context. At decision block 1520, a determination is made whether or not the attribute has been found. If not processing continues with decision block 1530; otherwise the search is complete.

At decision block 1530, a determination is made whether or not the object hierarchy has been exhausted. If the current object has a parent, then another level in the object hierarchy exists. However, if the current object does not have a parent, then the object hierarchy has been exhausted. At any rate, assuming the object hierarchy has been exhausted, processing continues with processing block 1540 during which the current object is updated to be the next object in the object hierarchy, i.e. its parent, and processing returns to processing block 1510.

Returning to decision block 1530, if the object hierarchy has been exhausted, processing proceeds to decision block 1550. At decision block 1550 a determination is made whether or not the context hierarchy has been exhausted. If there is no parent of the current context (context hierarchy exhausted), then the current stage of the search is complete. Otherwise, if the current context has a parent (context hierarchy not exhausted), then processing continues with processing block 1560.

At processing block 1560, the current context is updated to the next context (i.e., the parent of the current context). Then, at processing block 1570, the current object is reset to the original object to restart object hierarchy traversal in the new context.

It is worth mentioning at this point that while the processing blocks of a flow diagram illustrating a particular embodiment are presented and described in a particular order, there should be no implication that the present invention is limited by that particular ordering. Rather, it is contemplated that in alternative embodiments, the ordering of the processing blocks may be changed while preserving the core functionality. For example, in FIG. 15, at least the ordering of processing blocks 1560 and 1570 may be reversed without any effect.

Figure 16:
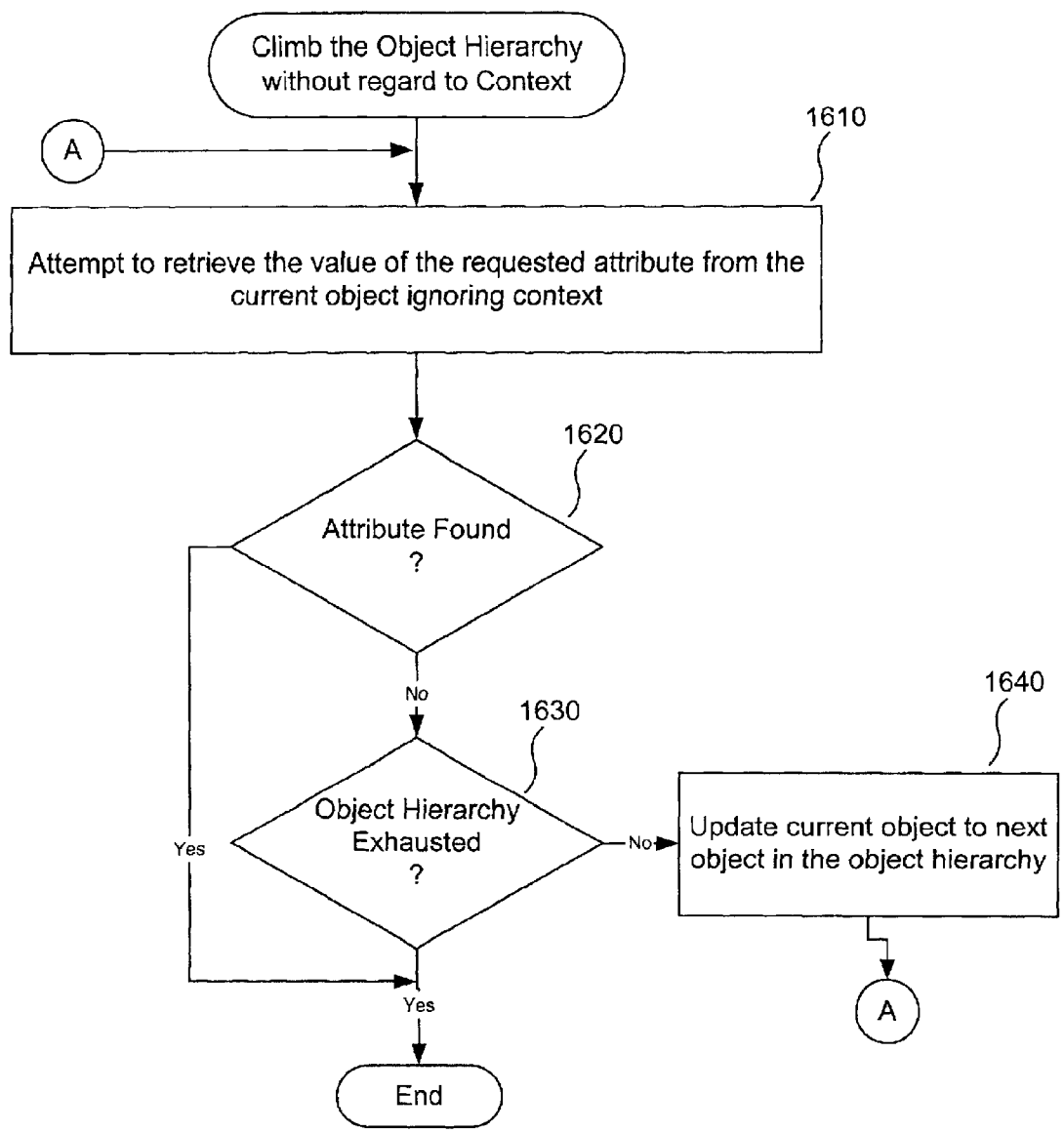
FIG. 16 is a flow diagram illustrating processing associated with traversal of an object hierarchy without regard to context according to one embodiment of the present invention.

FIG. 16 is a flow diagram illustrating processing associated with traversal of an object hierarchy without regard to context according to one embodiment of the present invention. At processing block 1610, an initial attempt to retrieve the desired value is made by ignoring the current context. A determination is made regarding whether the retrieval was successful at decision block 1620. If the attribute value has successfully been located search processing is complete; otherwise, processing continues with decision block 1630. At decision block 1630, a determination is made whether or not the object hierarchy is exhausted. If so, this third stage of processing is complete. Otherwise, processing proceeds to processing block 1640. At processing block 1640, the current object is updated to reflect the next object in the object hierarchy; and then processing returns to processing block 1610.

Importantly, while the flow diagrams described above imply a simple, linear, non-recursive algorithm, it is contemplated that in an actual code implementation it may be desirable to implement one or more of the methods as recursive procedures/functions.

Software Architecture for Processing an Improved Properties File Syntax

Figure 17:
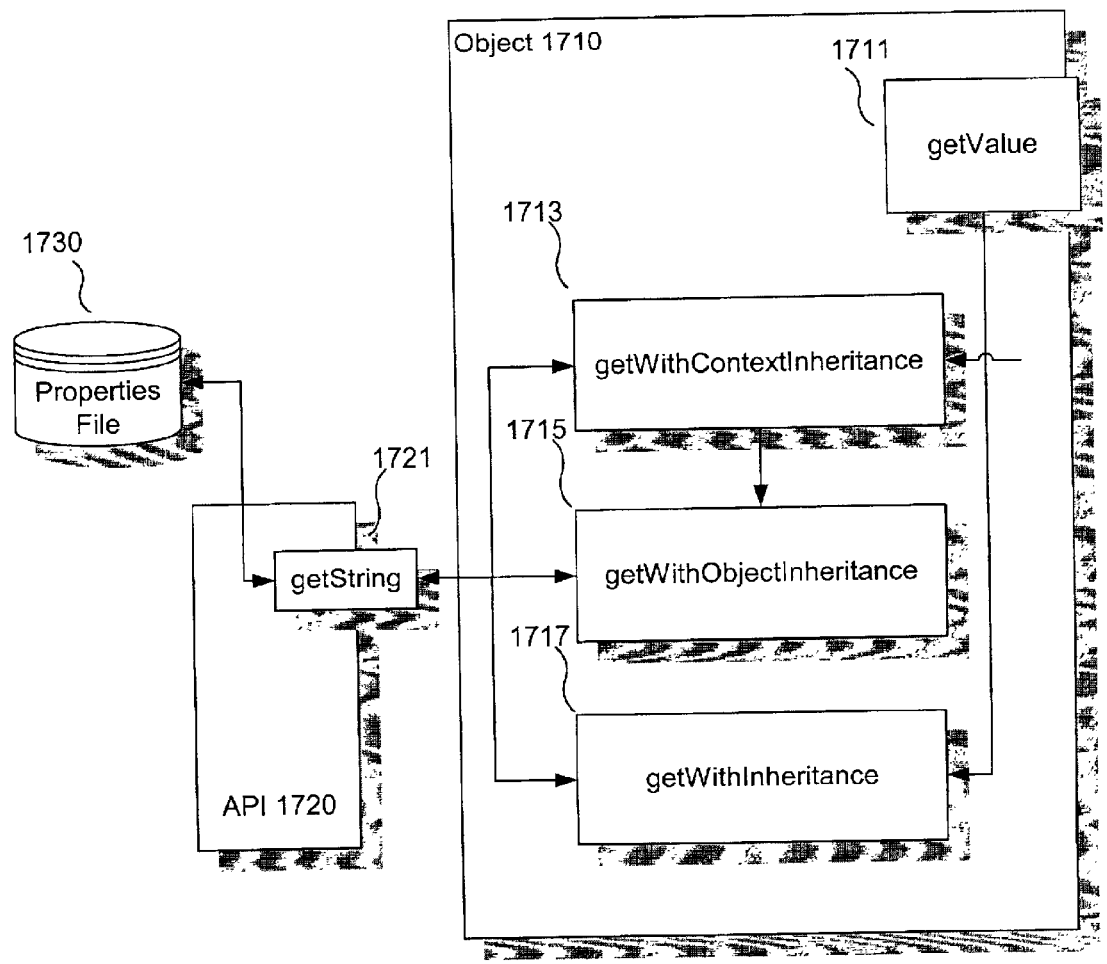
FIG. 17 is a block diagram the conceptually illustrates software architectural components that enable processing of an improved properties file syntax according to one embodiment of the present invention.

FIG. 17 is a block diagram that conceptually illustrates software architectural components that enable processing of an improved properties file syntax according to one embodiment of the present invention. According to this example, an object 1710 exposes a getValue( ) method 1711 which in turn may call a getWithContextInheritance( ) method 1713 and/or a getWithObjectInheritance( ) method 1715 and/or a getwithInheritance( ) method 1717. In alternative embodiment, the getValue( ) method 1711 may be private (i.e., not exposed outside of the object 1710).

According to one embodiment, object 1720 inherits logic from a base object that serves as an abstraction for the interface to API 1720. In this manner, object 1710 automatically has the ability to retrieve the value of any of its attributes without needing knowledge of the data store, e.g., properties file 1730 (e.g., by making the call underlying interface to the property data store, e,g.,properties file 1730 (e.g., by making the call getString 1721). Additionally, inheritance of this logic saves design and development time.

In one embodiment, the functionality of the getWithContextInheritance( ) method 1713 and get WithObjectInheritance( ) method 1715 are represented by the processing described with reference to FIG. 15; and the functionality of the getwithInheritance( ) method 1717 is represented by the processing described with reference to FIG. 16.

Importantly, while, for sake of generality, the properties file 1730 is shown as being accessed by API 1720, it is appreciated that the properties file 1730 may be internally represented with a resourceBundle object as described above. Also, if this is the case, the API 1720 would be the resourceBundle's exposed methods.

Exemplary Methods Accessible by the Objects

For the sake brevity, in the code examples of FIGS. 18–21, it is assumed that there exists a getContextname( ) method in every object that returns a string value containing the context/container name. Every object also is assumed to know how to figure out its name. In Java this is done by performing the call: getClass( ).getName( ). Subsequently, the left sub-parts of the name are removed to reveal the object name. In the following examples, this left sub-part removal (or alternatively, right sub-part extraction) is assumed to be performed by getName( ). Therefore, "pkg1.sub2.Obj3" would result in the object name of "Obj3". In the exemplary implementation every object is additionally assumed to extend some base object that implements a get Value( ) method, which returns the value of a key-value pair corresponding to a specified key. Therefore, every sub-component inherits the logic in the method getValue( ).

FIG. 18 illustrates exemplary code for the getValue method of FIG. 17 according to one embodiment of the present invention. In this example, the method returns the value of the requested attribute of the currently executing object, taking the current context into consideration.

FIG. 19 illustrates exemplary code for the getWithContextInheritance method of FIG. 17 according to one embodiment of the present invention. In this example, this method looks for the value of attribute, attrib, of an object named object as it is running in the context, context. If the specified attribute is not found in the specified context, the method looks in the parent context. Importantly, as it looks for the attribute in a given context, it also examines the object's hierarchy. The method uses recursion that terminates when (1) the desired value is found or (2) the whole hierarchy has been examined and the specified attribute cannot be found.

FIG. 20 illustrates exemplary code for the getWithObjInheritance method of FIG. 17 according to one embodiment of the present invention. In this example, this method looks for the value of attribute, attrib, of an object named object as it is running in the context, context. If the specified attribute is not found associated with the object running in the current context, then the method looks for the attribute in the object's parent running in the same context. That is, the method continues to climb up the object hierarchy while keeping the context fixed. The method uses recursion that terminates when (1) the desired value is found or (2) the whole hierarchy has been examined and the specified attribute cannot be found.

FIG. 21 illustrates exemplary code for the getWithInheritance method of FIG. 17 according to one embodiment of the present invention. In this example, this method looks for the value of attribute, attrib, of an object named object. If the specified attribute is not found, then the method looks for the attribute in the object's parent and continues to climb the object hierarchy until the method terminates. The method uses recursion that terminates when (1) the desired value is found or (2) the whole hierarchy has been examined and the specified attribute cannot be found.

Importantly, while not shown in the exemplary code fragments, a memory cache may be implemented to avoid repeating lookups for attributes. Briefly, when an object needs to calculate the value of some property it first checks if it is available in the cache. If it is, the value is retrieved from the cache; otherwise, the value may be retrieved from the properties file (via the resourceBundle and algorithms described above or the exemplary code of FIGS. 18–21). If the value is found in the properties file, a copy may be stored in the cache to avoid future file lookups and related processing.

In the foregoing specification, the invention has been described with reference to specific embodiments thereof. It will, however, be evident that various modification and change may be made thereto without departing from the broader spirit and scope of the invention. The specification and drawings are, accordingly, to be regarded in an illustrative rather than a restrictive sense.

What is claimed is:

1. A method comprising:

providing prerequisite information regarding pages of a graphical user interface (GUI) that are prerequisites to other pages of the GUI, each page including one or more sub-components;

in response to a request to display a destination page and with reference to the prerequisite information, instantiating a container object corresponding to the requested destination page of the GUI;

the container object identifying one or more prerequisite pages associated with the destination page by invoking an execution of a method of the container object;

the container object determining which sub-component of the one or more sub-components of an identified prerequisite page is a decider sub-component that is capable of confirming whether or not requirements of the identified prerequisite page have been satisfied;

the container object determining whether or not the requirements of the identified prerequisite page have been satisfied by invoking a method of a component object corresponding to an instance of the decider sub-component that causes stored information regarding the state of the identified prerequisite page to be retrieved from a current component object, the component object being a child object of the container object; and causing the output of the destination page to be displayed if all the requirements of the one or more identified prerequisite pages have been satisfied, otherwise causing the output of a prerequisite page of the one or more identified prerequisite pages having one or more requirements that have not been satisfied to be displayed by invoking an execution of a method of the corresponding component object to stream the content to the container object.

2. The method of claim 1 wherein the prerequisite information is stored in a Java properties file, wherein the method further comprises:

the container object instantiating a page sub-component prerequisite object using information stored in the Java properties file; and retrieving the prerequisite information by executing a method of the page sub-component prerequisite object, wherein the page sub-component prerequisite object streams the prerequisite information to the container object in response to the execution.

3. The method of claim 2, further comprising supporting hierarchical relationships of prerequisite pages by:

iterating through each of the identified prerequisite pages associated with the destination page in a predetermined order by executing a method of the corresponding page sub-component prerequisite object until encountering the first prerequisite page that has one or more requirements that have not been satisfied; and displaying the first prerequisite page of the identified prerequisite pages before displaying a second prerequisite page of the identified prerequisite pages that has one or more requirements that have not been satisfied, the second prerequisite page being dependent upon the first prerequisite page according to the predetermined order.

4. The method of claim 1, wherein the request to display the destination page comprises a HyperText Transfer Protocol (HTTP) request, and wherein the pages of the GUI comprise web pages.

5. The method of claim 2, wherein the prerequisite information includes a prerequisite property stored in the Java properties file for each of the pages of the GUI, the prerequisite property comprising a string identifying the one or more prerequisite pages.

6. The method of claim 5, wherein the prerequisite information in the Java properties file is structured as a list of attribute-value pairs, and wherein a syntax for identifying a first page, $page_1$, and a second page, $page_2$, as prerequisites of a third page, page 3, is substantially as follows:

$page_3.prereq=page_1\ page_2$.

7. The method of claim 2, further comprising modifying the prerequisite information via the Java properties file without necessitating recompilation of software code corresponding to the component object.

8. The method of claim 1, wherein said determining whether or not the requirements of the identified prerequisite page have been satisfied includes requesting that a page prerequisite object verify whether all its requirements have been satisfied by invoking an execution of a method of the page sub-component prerequisite object.

9. The method of claim 1, wherein page objects corresponding to the pages of the GUI and page prerequisite objects responsible for ensuring satisfaction of one or more prerequisite conditions are loosely coupled and are dynamically associated with each other by way of the prerequisite information.

10. A graphical user interface (GUI) system for enforcing page prerequisites comprising:

a properties data store including information regarding pages of the GUI that are prerequisites to other pages of the GUI;

a base agent to respond to requests to display a destination page of the GUI, in response to a request to display the destination page, the base agent causing the output of the destination page to be displayed if all the requirements of one or more prerequisite pages associated with the destination page have been satisfied, otherwise causing the output of a prerequisite page of the one or more prerequisite pages to be displayed by invoking an execution of a method of an object corresponding to each page associated with the destination page; and a prerequisite factory decoupling the pages from their respective prerequisite pages, the prerequisite factory to determine whether or not requirements of one or more identified prerequisite pages have been satisfied by causing information regarding the state of the one or more identified prerequisite pages to be retrieved from a current context.

11. The system of claim 10, wherein the prerequisite factory identifies the one or more prerequisite pages associated with the destination page by accessing the properties data store, determines which of one or more sub-components of an identified prerequisite page is a decider sub-component that is capable of confirming whether or not requirements of the identified prerequisite page have been satisfied, creates an instance of the decider sub-component, and determines whether or not the requirements of the identified prerequisite page have been satisfied by invoking a method of the instance that causes information regarding the state of the identified prerequisite page to be retrieved from the current context.

12. The system of claim 10, wherein the properties data store is a Java properties file, wherein the base agent is to
   instantiate a page sub-component prerequisite object using information stored in the Java properties file, and
   execute a method of the page sub-component prerequisite object to cause the page sub-component prerequisite object to stream the prerequisite information to the base agent.

13. The system of claim 12, wherein the prerequisite factory supports hierarchical relationships of prerequisite pages by:
   iterating through each of the identified prerequisite pages associated with the destination page in a predetermined order by executing a method of the corresponding page sub-component prerequisite object until encountering the first prerequisite page that has one or more requirements that have not been satisfied; and
   displaying the first prerequisite page of the identified prerequisite pages before displaying a second prerequisite page of the identified prerequisite pages that has one or more requirements that have not been satisfied, the second prerequisite page being dependent upon the first prerequisite page according to the predetermined order.

14. The system of claim 10, wherein the requests correspond to HyperText Transfer Protocol (HTTP) requests, and wherein the pages of the GUI comprise web pages.

15. The system of claim 12, wherein the information of the properties data store includes a prerequisite property stored in the Java properties file for each of the pages of the GUI, the prerequisite property comprising a string identifying the one or more prerequisite pages.

16. The system of claim 12, wherein at least a portion of the information of the properties data store is structured as a list of attribute-value pairs stored in the Java properties file, and wherein a syntax for identifying a first page, $page_1$, and a second page, $page_2$, as prerequisites of a third page, $page_3$, is substantially as follows:
   $page_3.prereq+page_1 page_2$.

17. The system of claim 10, wherein prerequisite relationships among two or more pages of the pages of the GUI are modified without necessitating recompilation of software code corresponding to the page sub-components by editing the information of the properties data store.

18. The system of claim 10, further comprising page objects corresponding to the pages of the GUI and page prerequisite objects responsible for ensuring satisfaction of one or more prerequisite conditions are loosely coupled and are dynamically associated with each other by way of the prerequisite information by invoking an execution of a method of the corresponding page sub-component prerequisite object.

19. A method comprising:
   identifying, at run-time, one or more prerequisite web pages associated with a requested web page by accessing a properties file by invoking a method of a container object corresponding to the requested web page;
   the container object determining whether requirements of the one or more identified prerequisite pages have been satisfied by instantiating and executing a method of one or more prerequisite objects corresponding to the identified prerequisite pages; and
   causing the output of the requested web page to be displayed if all the requirements of the one or more identified prerequisite pages have been satisfied, otherwise causing the output of a prerequisite page of the one or more identified prerequisite pages having one or more unsatisfied requirements to be displayed by executing a method of an object corresponding to the prerequisite page.

20. A machine-readable medium having stored thereon data representing sequences of instructions, the sequences of instruction which, when executed by a processor, cause the processor to:
   identify one or more prerequisite pages associated with a destination page by accessing a properties file in response to a request for the destination page by invoking a method of a container object corresponding to the destination page, the properties file including prerequisite information regarding pages of a graphical user interface (GUI) that are prerequisites to other pages of the GUI;
   determine using the container object which sub-component of an identified prerequisite page is capable of confirming whether or not requirements of the identified prerequisite page have been satisfied;
   determine whether the requirements of the identified prerequisite page have been satisfied by invoking from the container object a method of a component object corresponding to an instance of the sub-component that causes stored information regarding the state of the identified prerequisite page to be retrieved from a current component object, the component object being a child object of the container object; and
   cause the output of the destination page to be displayed if all the requirements of the one or more identified prerequisite pages have been satisfied, otherwise cause the output of a prerequisite page of the one or more identified prerequisite pages having one or more requirements that have not been satisfied to be displayed by invoking an execution of a method of the corresponding component object to stream the content to the container object.

21. The method of claim 1, wherein at least one component object comprises one or more sub-container objects, and wherein at least one of the sub-container objects includes one or more sub-components.

22. The method of claim 21, wherein the container objects and the component objects are maintained in a hierarchical structure, wherein the component objects are implemented within one or more leaf nodes, and wherein the container objects are implemented within one or more non-leaf nodes, each non-leaf node having at least one of a leaf sub-node and a non-leaf sub-node.

23. The method of claim 22, wherein a container object represents a page and a component object represent content of the page including at least one of the following:
   a chart;
   a table;
   a scroll list; and
   a data entry.

24. The method of claim 5, wherein a first sub-component is identified as a prerequisite of a second sub-component by assigning the first sub-component to the second sub-component having the string identifying the prerequisites appended to the second sub-component separated by a delimiter.

25. The method of claim 24, wherein the prerequisites of the second sub-component is inherited from the first sub-component.

26. The method of claim 25, wherein at least one prerequisite of the second sub-component used in a context is overridden by assigning an overriding value to the second sub-component having an identity of the context prefixed to an identity of the second sub-component separated by a delimiter.

\* \* \* \* \*